United States Patent
Hallihole et al.

(10) Patent No.: US 10,656,635 B2
(45) Date of Patent: May 19, 2020

(54) APPARATUS AND METHOD FOR PERFORMING PROCESS SIMULATIONS FOR EMBEDDED MULTIVARIABLE PREDICTIVE CONTROLLERS IN INDUSTRIAL PROCESS CONTROL AND AUTOMATION SYSTEMS

(71) Applicant: Honeywell International Inc., Morris Plains, NJ (US)

(72) Inventors: Sriram Hallihole, Bangalore (IN); Venkata Krishna Prasad Reddy Vurubindi, Nellore (IN); Mandar Vartak, Bangalore (IN); Lucy Liu, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 91 days.

(21) Appl. No.: 15/794,516

(22) Filed: Oct. 26, 2017

(65) Prior Publication Data

US 2018/0157247 A1 Jun. 7, 2018

Related U.S. Application Data

(60) Provisional application No. 62/429,192, filed on Dec. 2, 2016.

(51) Int. Cl.
*G05B 19/418* (2006.01)
*G06N 5/02* (2006.01)
*G05B 13/04* (2006.01)

(52) U.S. Cl.
CPC ..... *G05B 19/41885* (2013.01); *G05B 13/048* (2013.01); *G06N 5/022* (2013.01); *G05B 2219/31368* (2013.01); *G05B 2219/42058* (2013.01); *Y02P 80/40* (2015.11); *Y02P 90/26* (2015.11)

(58) Field of Classification Search
CPC ............ G05B 19/41885; G05B 13/048; G05B 2219/31368; G05B 2219/42058; G06N 5/022; Y02P 80/40; Y02P 90/26
See application file for complete search history.

(56) References Cited

U.S. PATENT DOCUMENTS

| 7,877,154 B2 * | 1/2011 | Blevins | G05B 17/02 700/29 |
| 2009/0112335 A1 * | 4/2009 | Mehta | G05B 13/048 700/29 |

(Continued)

OTHER PUBLICATIONS

Honeywell, "Control Builder Introduction", HPS Automation College, Apr. 2012, 18 pages.

(Continued)

*Primary Examiner* — Robert E Fennema
*Assistant Examiner* — Jonathan Michael Skrzycki

(57) ABSTRACT

A method includes retrieving process variable values from a multivariable predictive controller. The multivariable predictive controller is executed on an embedded platform and is configured to control an industrial process. The method also includes simulating how the multivariable predictive controller would attempt to control the industrial process based on the process variable values. The method further includes transmitting simulated process variable values to the multivariable predictive controller.

18 Claims, 21 Drawing Sheets

(56) References Cited

U.S. PATENT DOCUMENTS

| | | | | |
|---|---|---|---|---|
| 2010/0204808 A1* | 8/2010 | Thiele | ............... | G05B 17/02 |
| | | | | 700/30 |
| 2012/0072194 A1* | 3/2012 | Arnold | ............... | F02C 7/057 |
| | | | | 703/7 |
| 2014/0277718 A1* | 9/2014 | Izhikevich | ........... | B25J 9/163 |
| | | | | 700/250 |

OTHER PUBLICATIONS

Honeywell, "Advanced Process Control—APC Identifier User's Guide—An Integrated Part of Profit Design Studio (APCDE)", TP-SWIDNT Revision 1.5, May 2001, 376 pages.

Yutronic et al., "Design and Implementation of Advanced Automatic Control Strategy Based on Dynamic Models for High Capacity SAG Mill", 42nd Annual Meeting of the Canadian Mineral Processors, Jan. 2010, 12 pages.

Honeywell, "Experion PKS Overview—The Most Advanced, Open and Secure Control System Today", Honeywell Connected Industrial, Honeywell Process Solutions, 2016, 8 pages.

Honeywell, "Experion Profit Controller", Honeywell Product Information Note, Honeywell Process Solutions, Jan. 2017, 2 pages.

Peters et al., "Experion Profit Controller Technical Overview", 2016 Honeywell Users Group Americas, 2016, 10 pages.

Salliss, "Explore Profit Suite APC Running in ACE and C300", 2016 Honeywell Users Group Europe, Middle East and Africa, Oct. 2016, 17 pages.

Nordh, "Advanced Control, Optimization, and Monitoring", 2013 Honeywell Users Group Americas, 2013, 57 pages.

Honeywell, "Profit Controller", Honeywell Product Information Note, Honeywell Process Solutions, Dec. 2016, 2 pages.

Honeywell, "Profit Controller Multivariable Control and Optimization Technology", Automation & Control Solutions, Honeywell Process Solutions, Apr. 2012, 3 pages.

Honeywell, "Profit Suite R400 and Experion Integration—Simplified Engineering Configuration, Superior Operator Understanding and Enhanced Workflow", Product Information Note, Honeywell Process Solutions, Jun. 2010, 3 pages.

Honeywell, "UniSim Operations", Product Information Note, Honeywell Process Solutions, Nov. 2015, 4 pages.

* cited by examiner

FIG. 10

SYSTEM:CONTROLMODULE Block, CM_fast - Parameters (Project)

| Main | Arbitration | Projected Parameters | Block Pins | Configuration Parameters | Server History | Monitoring Parameters | Server Displays | Block Preferences | Control Confirmation | QVCS | Identification | Template Defining | Dependencies |

Tag Name: CM_fast
Item Name #: CM_2717_9110
Description #:
Engr Units #:
Keyword #:

Execution
Execution Period: 5sec
Execution Order in CEE: 10
Execution Phase: -1
CEE Restart Option: ALWAYS COLD

Alarming
☑ Enable Alarming Option   ☐ Journal Only Option

Fieldbus Specific
Execution Order in LINK: 10
Stale Count: 3
FF Execution Period: 1s Extend TPS Point: NO
Parent Asset: # URT
Unit Text:
Version: 0.00
Logic Block Initialization Option: PULSEEXPIRED

SCM Relationship
SCM Option: NONE
SCM Name:
Mode Attribute Reference:

Reload Initialization
Reload Init Delay (exec. cycles): 2
Cur Rel Init Delay (exec. cycles): 0
Initialization Pending: OFF OK    Cancel    Help ☐ Show Parameter Names

1000

Select Starting BIAS Value Options

○ Read BIAS From xs  ● Use Current Values  ○ User Entered BIAS

| Var | BIAS in xs | Current | User Enter |
|---|---|---|---|
| CV1 : FSIMA4_COT_PV | 0 | 0.737461566925049 | 0.737461566925049 |
| CV2 : FSIMA4_FR_PV | 0 | 0.7284175157547 | 0.7284175157547 |
| CV3 : FSIMA4_FD_OP | 0 | -0.712521314620972 | -0.712521314620972 |
| CV4 : FSIMA4_F1_OP | 0 | 0.150147914886475 | 0.150147914886475 |
| CV5 : FSIMA4_F2_OP | 0 | 0.74866247177124 | 0.74866247177124 |
| CV6 : FSIMA4_O2_PV | 0 | -0.00894432235509157 | -0.00894432235509157 |
| CV7 : FSIMA4_DRAFT_PV | 0 | 0 | 0 |
| MV1 : FSIMA4_F1_SP | 0 | 0.00625210534781218 | 0.00625210534781218 |
| MV2 : FSIMA4_F2_SP | 0 | 0.155388489365578 | 0.155388489365578 |
| MV3 : FSIMA4_FD_SP | 0 | -2.25416707992554 | -2.25416707992554 |
| MV4 : FSIMA4_FA_SP | 0 | 0 | 0 |
| MV5 : FSIMA4_HD_OP | 0 | 0 | 0 |
| DV1 : FSIMA4_HV1_PV | 0 | 0 | 0 |
| DV2 : FSIMA4_HV2_PV | 0 | 0 | 0 |

[ Copy XS BIAS to User ]  [ Copy Current to User ]  [ Clear User Variables ]

| ▼ | BuildSimulator | | | | | | |
|---|---|---|---|---|---|---|---|
| PSOS | Trend | Messages | | | | | |

1700

Furnace4_sim3.PROFITCTLA

| ON | OFF | WARM | OPTIMIZING | SIMULATION |
|---|---|---|---|---|
| | | | CEE STATE : RUN | Exec. Environment: CE |
| | | | ⟳ 1894.0 | CM EXEC. PERIOD(Se |

| Controller | CV | MV | DV | My View | | | |
|---|---|---|---|---|---|---|---|
| Summary | Detail | Optimize | Control | Process | Simulate | OP-PV | |

| Filter ▼ | Custom ▼ | | Hide ▼ | Unhide ▼ | Hidden Row Status | Normal ▼ | Nearing ▼ | Optimize ▼ | Violating ▼ |
|---|---|---|---|---|---|---|---|---|---|
| | MV # | MV Name | MV Description | | | Start Value | | | Un-measured Disturbance |
| ▲ | 1 | FSIMA4_F1_SP | Flow F1 | | | -1.11E-04 | | | -1.11E-04 |
| | 2 | FSIMA4_F2_SP | Flow F2 | | | 0.0814 | | | 0.0814 |
| | 3 | FSIMA4_FD_SP | Flow FEED | | | -1.2198 | | | -1.2198 |
| | 4 | FSIMA4_FA_SP | Flow Air | | | 0 | | | 0 |
| | 5 | FSIMA4_HD_OP | Flow Air | | | 0 | | | 0 |

FIG. 17

APPARATUS AND METHOD FOR PERFORMING PROCESS SIMULATIONS FOR EMBEDDED MULTIVARIABLE PREDICTIVE CONTROLLERS IN INDUSTRIAL PROCESS CONTROL AND AUTOMATION SYSTEMS

CROSS-REFERENCE TO RELATED APPLICATION AND PRIORITY CLAIM

This application claims priority under 35 U.S.C. § 119(e) to U.S. Provisional Patent Application No. 62/429,192 filed on Dec. 2, 2016. This provisional application is hereby incorporated by reference in its entirety.

TECHNICAL FIELD

This disclosure relates generally to industrial process control and automation systems. More specifically, this disclosure relates to an apparatus and method for performing process simulations for embedded multivariable predictive controllers in industrial process control and automation systems.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Multivariable predictive controllers have long been used in chemical process industries or other industries to drive complex systems that are interactive with transport delays to operate at limits that are economically beneficial. Due to the increasing computational availability in embedded environments, multivariable predictive controllers are now being offered as standard products at the distributed control system (DCS) level. Implementations of embedded multivariable predictive controllers can provide various advantages, such as fault tolerant control, faster execution, easier configuration and maintenance, integrated DCS displays, and better alarming.

SUMMARY

This disclosure provides an apparatus and method for performing process simulations for embedded multivariable predictive controllers in industrial process control and automation systems.

In a first embodiment, a method includes retrieving process variable values from a multivariable predictive controller. The multivariable predictive controller is executed on an embedded platform and is configured to control an industrial process. The method also includes simulating how the multivariable predictive controller would attempt to control the industrial process based on the process variable values. The method further includes transmitting simulated process variable values to the multivariable predictive controller.

In a second embodiment, an apparatus includes at least one processor configured to retrieve process variable values from a multivariable predictive controller. The multivariable predictive controller is executed on an embedded platform and is configured to control an industrial process. The at least one processor is also configured to simulate how the multivariable predictive controller would attempt to control the industrial process based on the process variable values. The at least one processor is further configured to transmit simulated process variable values to the multivariable predictive controller.

In a third embodiment, a non-transitory computer readable medium contains instructions that when executed cause at least one processing device to retrieve process variable values from a multivariable predictive controller. The multivariable predictive controller is executed on an embedded platform and is configured to control an industrial process. The medium also contains instructions that when executed cause the at least one processing device to simulate how the multivariable predictive controller would attempt to control the industrial process based on the process variable values. The medium further contains instructions that when executed cause the at least one processing device to transmit simulated process variable values to the multivariable predictive controller.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4 through 19 illustrate example graphical user interfaces used to support process simulations for embedded multivariable predictive controllers in industrial process control and automation systems according to this disclosure.

DETAILED DESCRIPTION

FIGS. 1 through 24, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
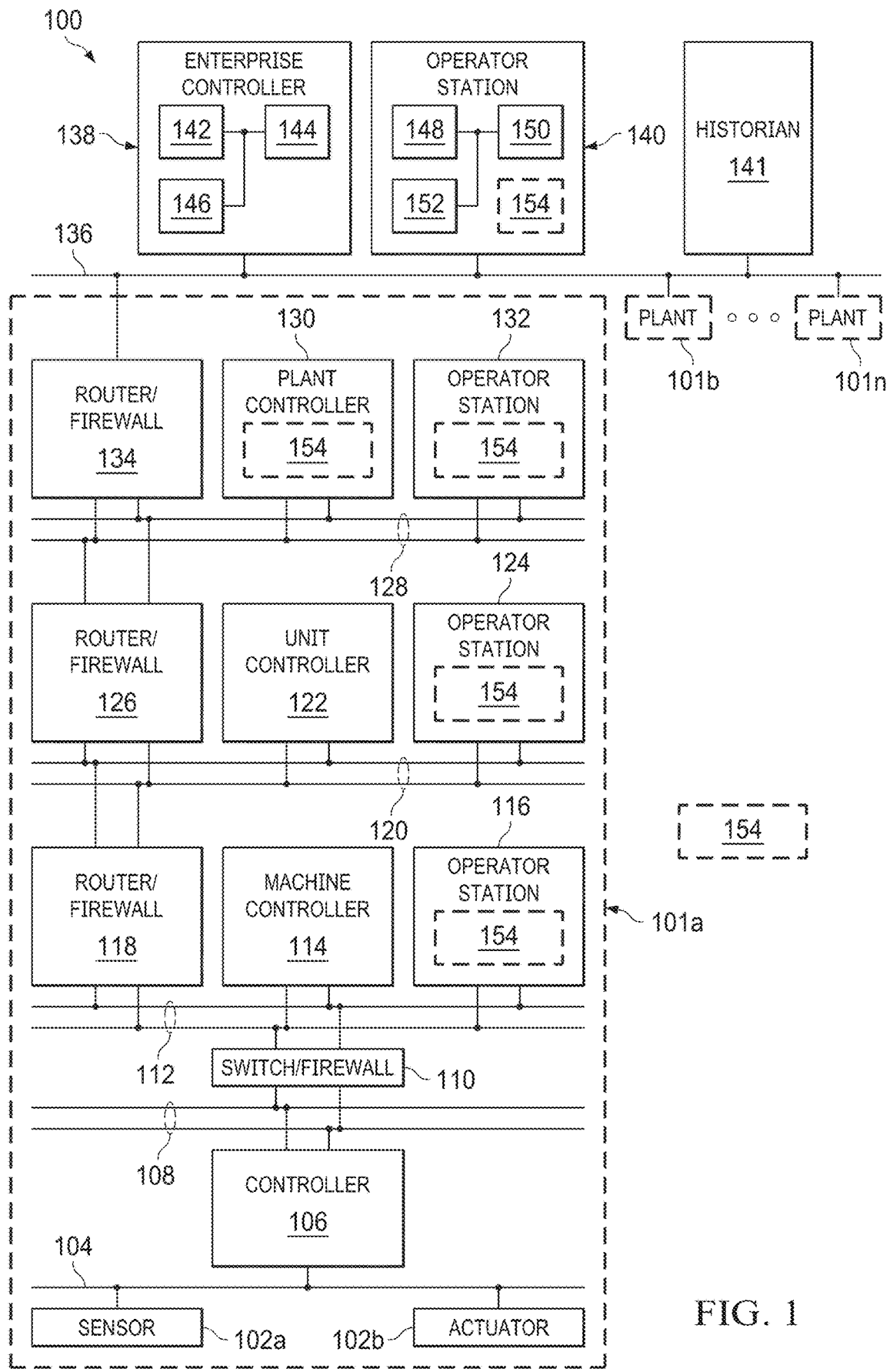
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a microcontroller, a proportional-integral-derivative (PID) controller, or a multivariable controller, such as a Robust Multivariable Predictive Control Technology (RM-PCT) controller or other type of controller implementing model predictive control (MPC) or other advanced predictive control (APC). As a particular example, each controller 106 could represent a computing device running a real-time operating system or other operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system or other operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers. Each processing device 142, 148 includes any suitable computing or processing device, such as a microprocessor, microcontroller, digital signal processor, application specific integrated circuit, field programmable gate array, or discrete logic devices. Each memory 144, 150 includes any suitable volatile or non-volatile storage and retrieval device, such as a random access memory (RAM) or Flash memory. Each interface 146, 152 includes any suitable structure supporting communications over one or more communication paths.

As noted above, multivariable predictive controllers have long been used in various industries to control complex systems. For example, any of the controllers 106, 114, 122, 130, 138 in FIG. 1 could denote a multivariable predictive controller. A multivariable predictive controller generally denotes an industrial process controller that estimates or predicts how multiple process variables associated with an industrial process are expected to behave in the future. The operation of the industrial process could then be altered as needed or desired to achieve certain functions, such as safe operation, operation near desired setpoints, maximum profits, or minimum raw material or energy usage. The predictions are often made using one or more process models, which mathematically represent the dynamic behaviors of the industrial process. In some instances, multivariable predictive controllers can operate using controlled, manipulated, and disturbance variables. A controlled variable (CV) denotes a variable whose value is controlled to be at or near a desired value or within a desired range of values. A manipulated variable (MV) denotes a variable whose value is adjusted in order to alter one or more controlled variables. A disturbance variable (DV) denotes a variable whose value can be considered during control operations but generally cannot be modified.

Multivariable predictive controllers can be implemented in embedded environments within industrial process control and automation systems, such as within distributed control systems (DCSs). However, it is often necessary or desirable to simulate the operation of a multivariable predictive controller. For example, a simulation could be performed in order to validate the design of a multivariable predictive controller before the controller is actually deployed into an industrial control and automation system. Unfortunately, conventional simulators for multivariable predictive controllers fall short in various ways. For instance, one challenge is how to simulate a real-time industrial process because doing so often requires that the simulated process and an actual process model used to build a controller match as closely as possible.

In accordance with this disclosure, the system 100 includes or supports at least one multivariable predictive controller simulator 154. Among other things, the simulator 154 is used to simulate operation of an embedded multivariable predictive controller, where the controller can run in an embedded platform while the process simulation runs in an offline environment. The embedded controller has one or more parameters to receive process measurements from the offline simulation. The offline simulation environment can simulate an industrial process at every controller execution by reading control moves from the actual embedded controller and then simulating the process using this data. Simulated process measurements can also be sent back to the embedded controller.

The simulator 154 provides seamless integration of offline process simulations with embedded multivariable predictive controllers and the process models used to build the controllers. A controller can switch seamlessly between offline simulations and real-time process control operations. Also, a controller could be taken offline at any time for simulation, and the controller can switch from offline to online operation with a single handle.

The simulator 154 can also measure the total runtime memory needed to run a controller in an embedded environment. If the memory required does not fit into an embedded platform, the simulator 154 can recommend changes to the controller's design, such as changes to the controller's execution frequency or controller size. The simulator 154 could further provide guidelines to a user on how fast a controller can be executed without overshooting the memory limitations of an embedded platform.

Among other things, the simulator 154 can be used to validate the design of multivariable predictive controllers in an offline manner. This allows the design of a multivariable predictive controller to be validated offline before the controller is used to control a real industrial process. Also, it is generally easier to redesign a controller during offline simulation compared to loading a controller into an online environment and making changes to the process model used by the controller. Further, an embedded environment can restrict how much runtime memory that a multivariable predictive controller can use. The simulator 154 supports the calculation of runtime memory requirements for a multivariable predictive controller, which can help a user make better and more accurate decisions regarding the design of the controller. For instance, a user could use this information to select what controller size can be designed and what the execution frequency of the controller can be.

The multivariable predictive controller simulator 154 could be implemented in any suitable manner. For example, in some embodiments, the multivariable predictive controller simulator 154 could be implemented using software or firmware instructions that are executed by one or more processors of at least one of the operator stations 116, 124, 132, 140. The multivariable predictive controller simulator 154 could also be implemented separate from the operator stations, such as when the multivariable predictive controller simulator 154 resides on and is executed by a standalone computer like a local or remote server. However, the multivariable predictive controller simulator 154 could be implemented in any other suitable manner.

In some embodiments, various parameters could be added to a multivariable predictive controller (such as an MPC function block executed by any of the controllers 106, 114, 122, 130, 138) to support the use of offline simulation. For example, a USESIMULATION flag could be enabled to disconnect an embedded controller from a real-time industrial process so that the controller starts using simulated values instead. As another example, a DCSVALUE parameter can be added to CV, MV, and DV structures of the embedded controller. The simulator 154 can update a DCSVALUE parameter by simulating an actual process and providing the simulated value to the embedded controller.

With respect to runtime memory calculations, the following represents one example type of output from the simulator 154:

Expected Runtime Memory Requirement for this Controller:
 Approx. Auxiliary Memory Required (KB): 64.04102
 Approx. Shared Memory Required (KB): 133.5977
 Approx. Heap Memory Required (KB): 581.043

Here, auxiliary memory denotes the runtime memory used by an embedded controller that is tracked by embedded hardware for redundancy. Shared memory denotes the runtime memory used by the embedded controller that is tracked using software. Heap memory denotes the runtime memory used by the embedded controller that is not required to be tracked for redundancy. These values could be summed or used in other ways to verify whether the runtime memory requirements of the controller can be met in a specified embedded environment.

In particular embodiments, the PROFIT SUITE ENGINEERING STUDIO from HONEYWELL INTERNATIONAL INC. can be used to perform process modeling and offline process simulation, to connect to an embedded controller, and to send process measurements and disturbances. In other particular embodiments, the PROFIT SUITE OPERATOR STATION from HONEYWELL INTERNATIONAL INC. can be used to monitor both simulated and online embedded multivariable predictive controllers and to support closed-loop or open-loop model identification of embedded controllers.

Additional details regarding specific implementations of the multivariable predictive controller simulator 154 are provided below. Note that some of these details relate to specific implementations of the multivariable predictive controller simulator 154, such as those implemented using EXPERION technology from HONEYWELL INTERNATIONAL INC. Of course, other embodiments of the multivariable predictive controller simulator 154 could also be used.

Although FIG. 1 illustrates one example of an industrial process control and automation system 100, various changes may be made to FIG. 1. For example, a control and automation system could include any number of sensors, actuators, controllers, servers, operator stations, networks, multivariable predictive controller simulators, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which multivariable predictive controller simulation can be used. This functionality can be used in any other suitable device or system.

Figure 2:
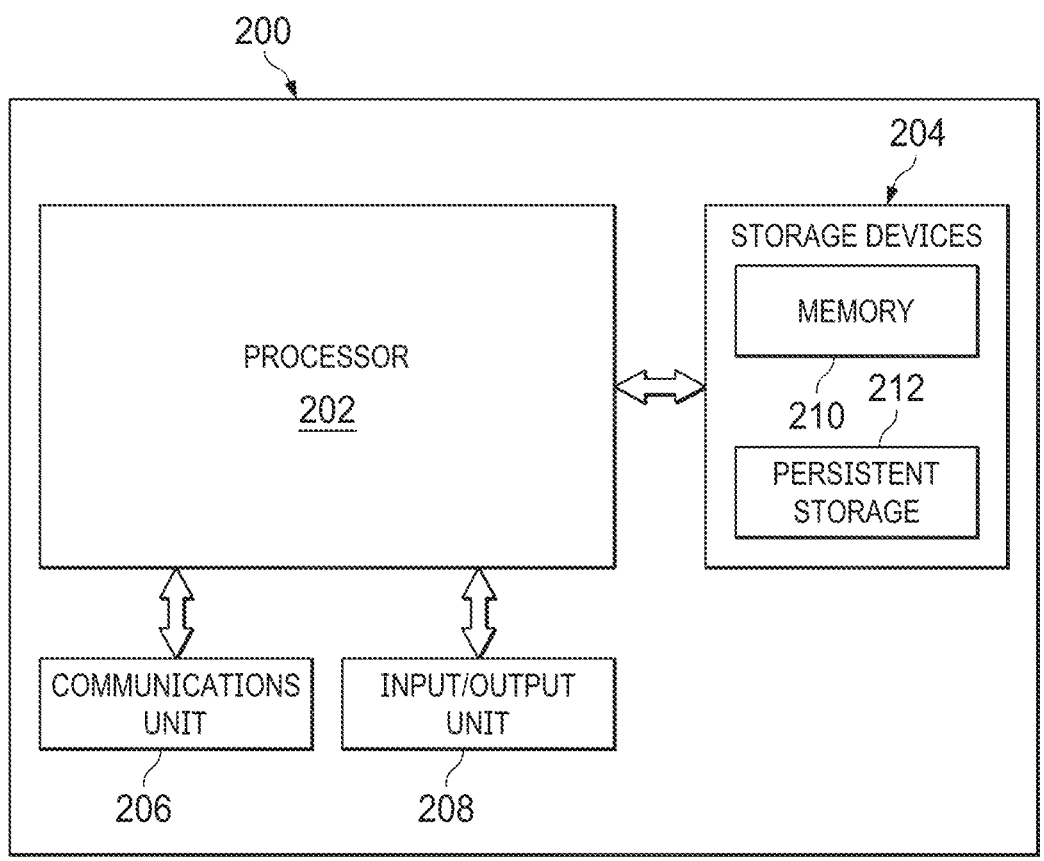
FIG. 2 illustrates an example device supporting process simulations for embedded multivariable predictive controllers in industrial process control and automation systems according to this disclosure.

FIG. 2 illustrates an example device 200 supporting process simulations for embedded multivariable predictive controllers in industrial process control and automation systems according to this disclosure. For example, the device 200 could denote a device that executes a multivariable predictive controller or a device that executes the multivariable predictive controller simulator 154.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors (DSPs), field programmable gate arrays (FPGAs), application specific integrated circuits (ASICs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting process simulations for embedded multivariable predictive controllers in industrial process control and automation systems, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration.

Figure 3:
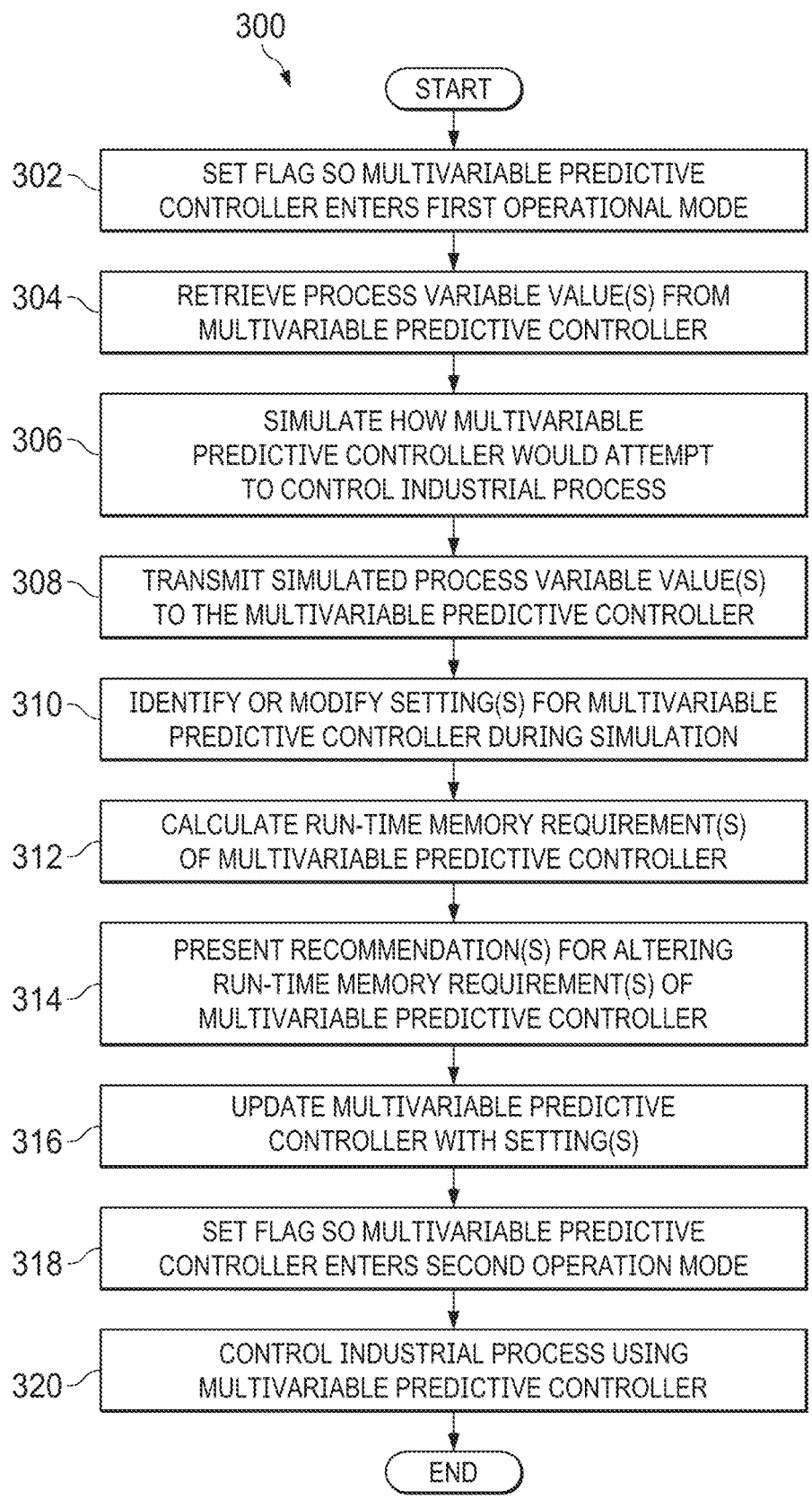
FIG. 3 illustrates an example method for performing process simulations for embedded multivariable predictive controllers in industrial process control and automation systems according to this disclosure.

FIG. 3 illustrates an example method 300 for performing process simulations for embedded multivariable predictive controllers in industrial process control and automation systems according to this disclosure. For ease of explanation, the method 300 is described as involving the multivariable predictive controller simulator 154 in the system 100 of FIG. 1 executed by the device 200 of FIG. 2. However, the method 300 could be performed using any suitable device(s) and in any suitable system(s).

As shown in FIG. 3, a flag is set to cause a multivariable predictive controller to enter a first operational mode at step 302. This could include, for example, a user using an operator station 116, 124, 132, 140 to enable a USESIMULATION flag of a controller 106, 114, 122, 130, 138. This can cause the controller to disconnect from a real-time industrial process so that the controller stops actively controlling the industrial process and starts using simulated CV, MV, and/or DV values. The controller could represent a multivariable predictive controller being executed on an embedded platform.

During this mode, one or more process variable values can be retrieved from the multivariable predictive controller at step 304. Also, at least one simulation simulating how the multivariable predictive controller would attempt to control an industrial process can be performed at step 306. Further, one or more process variable values can be transmitted to the multivariable predictive controller at step 308. This could include, for example, the multivariable predictive controller simulator 154 interacting with the controller 106, 114, 122, 130, 138. The multivariable predictive controller simulator 154 can read and write data values to DCSVALUE parameters of the controller in order to send and retrieve CV, MV, and DV values. This could also include the multivariable predictive controller simulator 154 performing simulations using control logic (such as control logic currently used by the controller or control logic that could be provided to the controller for use) in order to estimate how the controller would behave using the control logic. One or more models of the industrial process could be used here to estimate how the industrial process behaves, and these models could be obtained in any suitable manner (such as closed-loop or open-loop model identification).

Moreover, during this mode, one or more settings of the multivariable predictive controller can be identified or modified at step 310. This could include, for example, the multivariable predictive controller simulator 154 receiving from the user one or more settings for the controller 106, 114, 122, 130, 138. The settings of the controller could relate to execution intervals, controller tunings, or any other settings of the controller. The settings could be obtained in any suitable manner, such as through a graphical user interface.

Using the setting(s), one or more run-time memory requirements of the multivariable predictive controller can be calculated at step 312. This could include, for example, the multivariable predictive controller simulator 154 identifying how much memory might be needed to store the control logic of the controller 106, 114, 122, 130, 138 and the data used, generated, or collected by the controller. In particular embodiments, the amount of auxiliary memory, shared memory, and heap memory could be determined by the multivariable predictive controller simulator 154. At least one recommendation for altering the one or more run-time memory requirements of the multivariable predictive controller can be presented to a user at step 314. This could include, for example, the multivariable predictive controller simulator 154 comparing the current run-time memory requirements of the controller to an amount of memory available in the embedded platform. This could also include the multivariable predictive controller simulator 154 estimating the run-time memory requirements of the controller using different execution intervals, controller tunings, or other settings of the controller. The user could also provide different settings for the controller for use in recalculating the run-time memory requirements. The one or more settings can be used to update the multivariable predictive controller at step 316. This could include, for example, the multivariable predictive controller simulator 154 writing the new setting(s) to the controller for use in controlling the industrial process.

The flag is set to cause the multivariable predictive controller to enter a second operational mode at step 318. This could include, for example, the user using the operator station 116, 124, 132, 140 to disable the USESIMULATION flag of the controller 106, 114, 122, 130, 138. This can cause the controller to connect to the real-time industrial process. In this mode, the multivariable predictive controller can be used to control an industrial process at step 320. This could include, for example, the controller using actual CV, MV, and DV values and one or more models to make predictions about the behavior of the real-time industrial process and to determine how to adjust the real-time industrial process.

In this way, the multivariable predictive controller simulator 154 can provide a number of functions and benefits, depending on the implementation. The following are examples of the types of functions and benefits that can be supported by or obtained using the simulator 154. The simulator 154 can support any one or any combination of these features depending on the implementation.

The multivariable predictive controller simulator 154 provides support for switching a multivariable predictive controller between offline simulation and online control using a single handle (USESIMULATION). An embedded controller can be taken offline at any time for simulation. An offline simulated controller can be connected to a real-time process at any time for online control. The DCSVALUE parameters in the CV, MV, and DV structures can be used to receive or provide process simulation data.

Moreover, the simulator 154 supports the calculation of runtime memory requirements upfront, which can support better decision making. For instance, recommendations about a possible set of feasible controller execution frequencies for an embedded platform can be provided to a user, and these recommendations can be based on memory limitations and system free memory available on that platform.

Further, the simulator 154 supports seamless integration between process modeling, online control, and process simulation. Users can be given options to save different variations of a process model, build a controller with a combination of different process models and different execution frequencies and simulations, and simulate an embedded controller built using the above steps. In addition, the simulator 154 supports running process simulations outside an embedded platform while a controller is running on the embedded platform and supports updating a simulated controller's tunings to an online embedded controller, such as with one click. Finally, the simulator 154 supports parallel execution of multiple simulations connected to different embedded controllers and supports closed-loop or open-loop model identification of the controllers.

Although FIG. 3 illustrates one example of a method 300 for performing process simulations for embedded multivariable predictive controllers in industrial process control and automation systems, various changes may be made to FIG. 3. For example, while shown as a series of steps, various steps in FIG. 3 could overlap, occur in parallel, occur in a different order, occur any number of times, or be omitted. As a particular example, not all of steps 304-316 need to be performed after the multivariable predictive controller is placed in the first operational mode. The specific functions that occur while the multivariable predictive controller is in the first operational mode and the order of those functions can vary depending on the needs of the user.

FIGS. 4 through 19 illustrate example graphical user interfaces used to support process simulations for embedded multivariable predictive controllers in industrial process control and automation systems according to this disclosure. Note that the following describes a particular implementation of the inventive approaches for performing process simulations for embedded multivariable predictive controllers. In particular, the following describes how EXPERION technology can be used to implement the described approaches. As noted above, other embodiments of the multivariable predictive controller simulator 154 could also be used. In the description below, the PROFIT SUITE ENGINEERING STUDIO is referred to as "PSES," and the PROFIT SUITE OPERATOR STATION is referred to as "PSOS." PSES can be used to perform or initiate open-loop and closed-loop step testing for an EXPERION PROFIT controller and to build controller models and settings. PSES can also be used to interact with EXPERION CONTROL BUILDER to push models and tunings to an EXPERION PROFIT controller control module, run simulations, and provide auto-documentation for EXPERION PROFIT controller projects. The following describes an example workflow for running an EXPERION PROFIT controller simulation using PSES.

Figure 4:
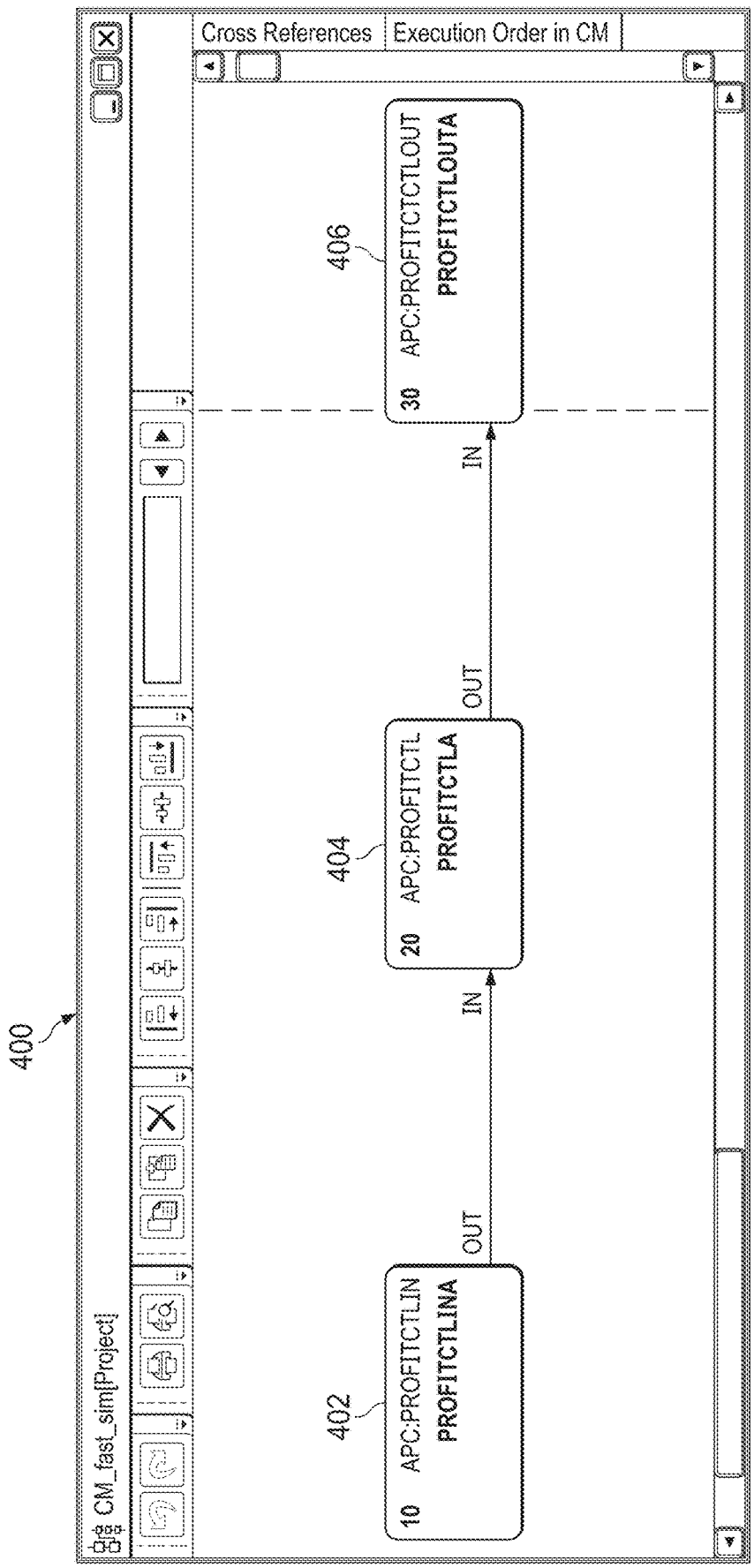

Step 1: In EXPERION CONTROL BUILDER, a user creates an empty shell PROFIT controller control module (CM) with three function blocks (FBs). An example of this is shown in FIG. 4, where a graphical user interface 400 allows the user to insert or otherwise include three function blocks 402-406. The function block 402 (ProfitCtlI(n)) represents an input for the control module, the function block 404 (ProfitCtl) represents control logic for the control module, and the function block 406 (ProfitCtlOut) represents an output for the control module. The inputs and outputs of the function blocks 402-406 are connected, and the control module can be saved and closed in CONTROL BUILDER.

Figure 5:
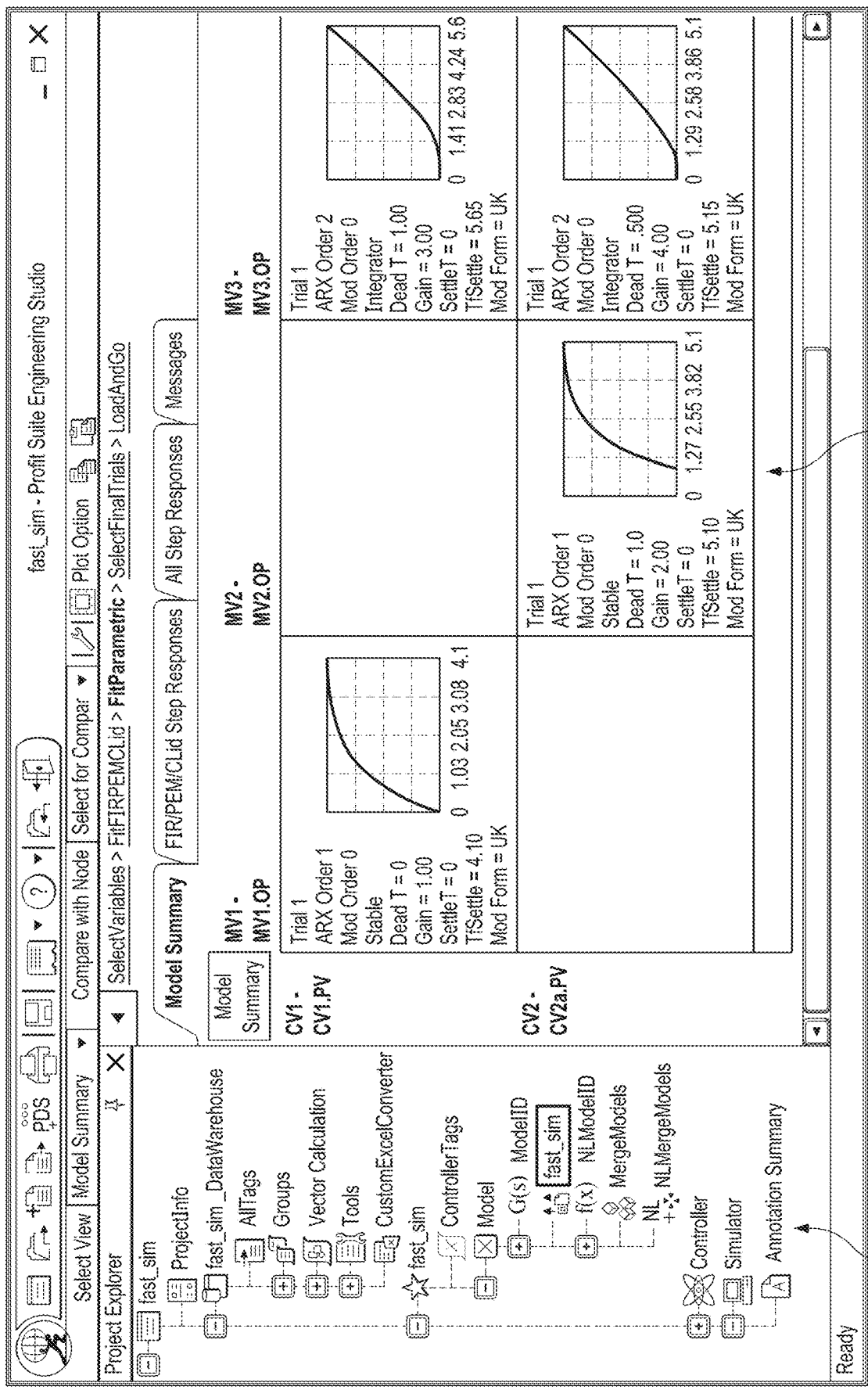

Step 2: The user opens PSES, creates a PROFIT controller application, and obtains one or more process models. The process models can be obtained in any suitable manner. For instance, data can be imported, and open-loop or closed-loop model identification could be performed. If process models already exist, an existing model file could be imported, or an existing PROFIT controller PSES project with models could be opened. An example of this is shown in FIG. 5, where a graphical user interface 500 includes a tree 502 that allows the user to navigate to different information or functions. In this example, the user has elected to generate various models

504 associated with an industrial process. The models 504 can be used to create a simulated PROFIT controller block, which is associated with the function block 404 in FIG. 4.

Figure 6:
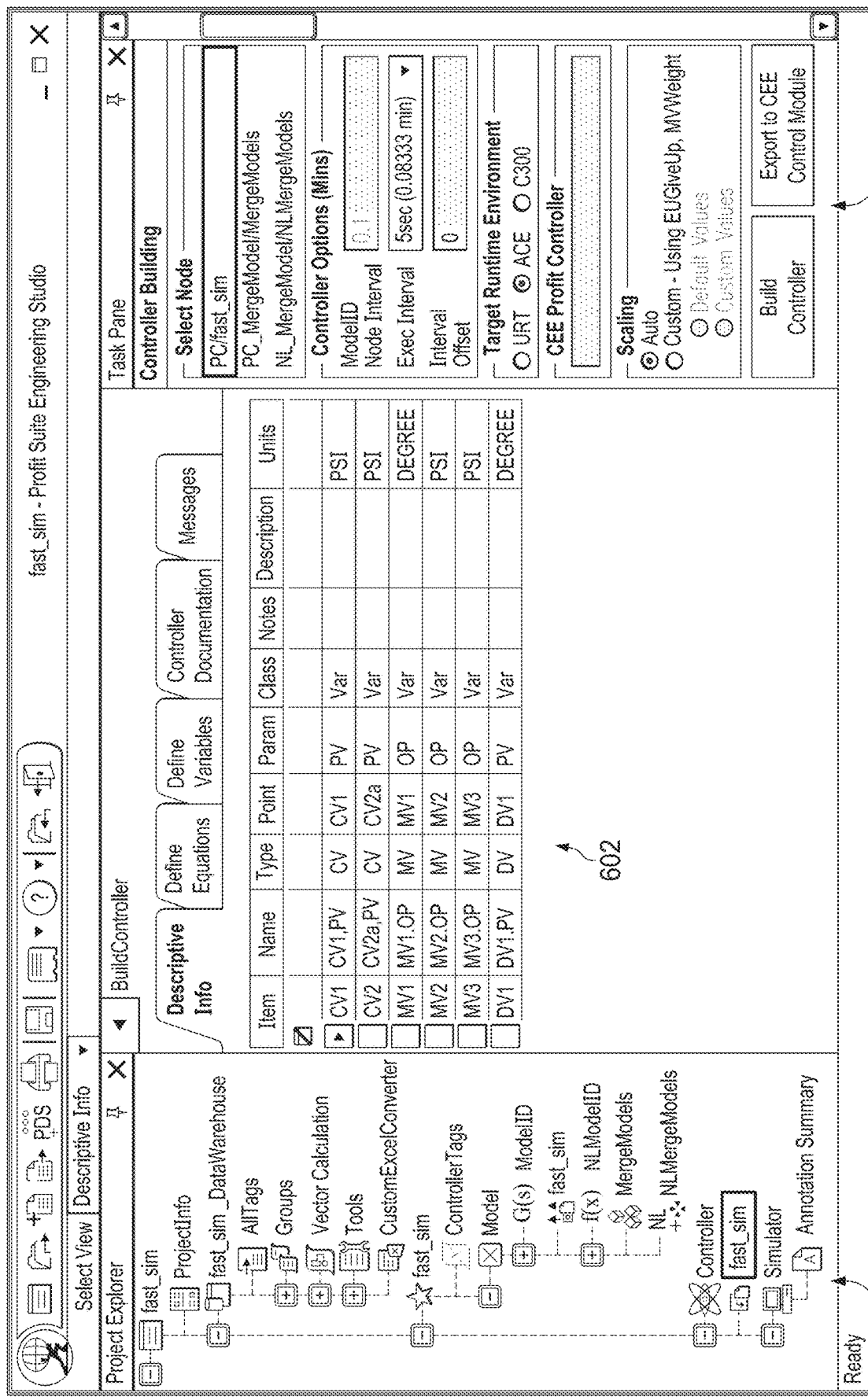

Step 3: The user creates a new controller node. An example of this is shown in FIG. 6, where the user has created a new controller node under the "controller" option in the tree 502 of the graphical user interface 500. The user can select the new controller node, such as by double clicking it. This causes the graphical user interface 500 to present the user with a list 602 of the process variables associated with the controller, which are also the process variables associated with the various models obtained in Step 2 and shown in FIG. 5. In a task pane 604, the user can select various options for the new controller node. For instance, the user can select a target runtime environment (URT, ACE, or C300 in this example) based on the platform onto which the controller will be loaded and in which the simulated control module will be run. The user can also select an appropriate execution interval from the intervals that are available for the selected target platform type. In some cases, PSES can select a default interval that most closely matches the model interval, and the user is allowed to select a different interval. The user can then click on the "Build Controller" button.

Figure 7:
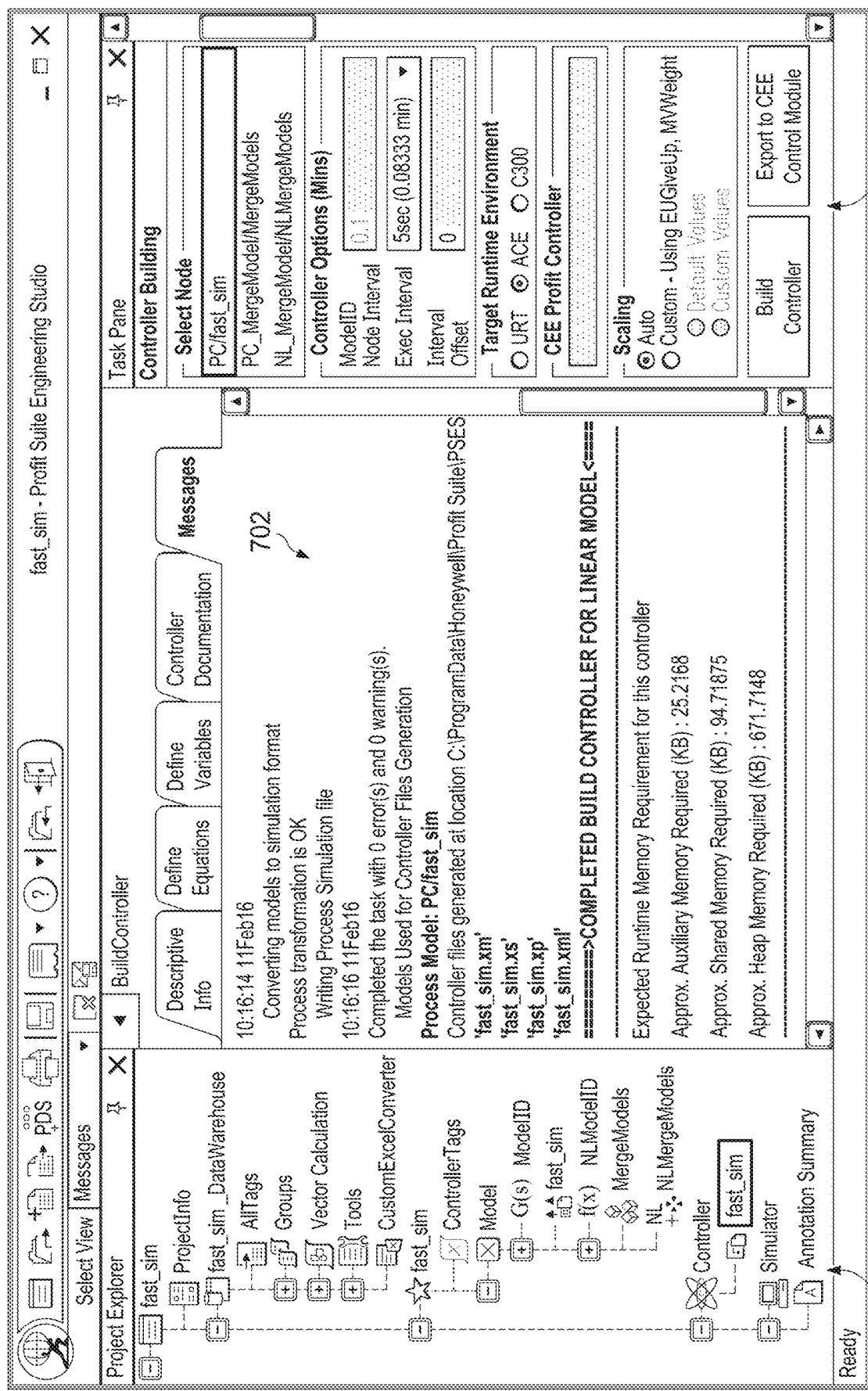

Step 4: PSES builds the files for the controller and a process simulator based on the user's selections in the task pane 604. PSES also calculates the expected runtime memory requirements for the control module being built. The expected runtime memory requirements can be displayed to the user, such as after the user selects a "Messages" tab in the graphical user interface 500. Example contents 702 that could be generated by PSES are shown in FIG. 7. This step essentially exports a simulated PROFIT controller model to a simulated PROFIT controller control module.

Figure 8:
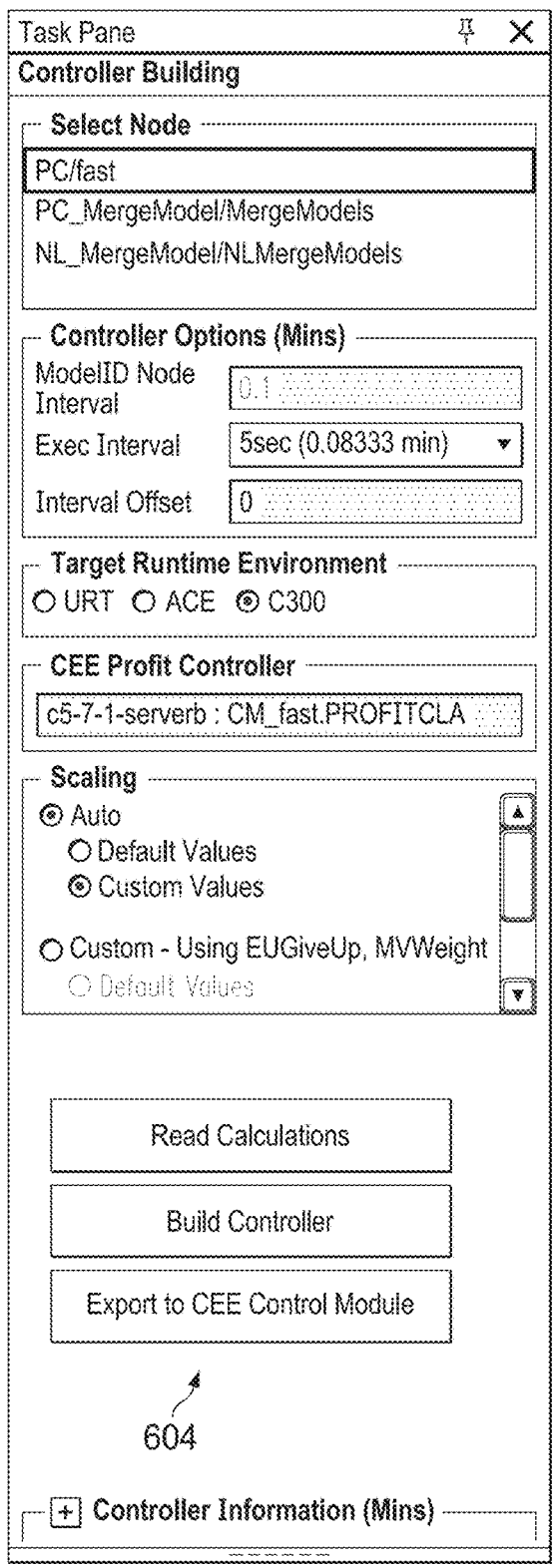
Figure 9:
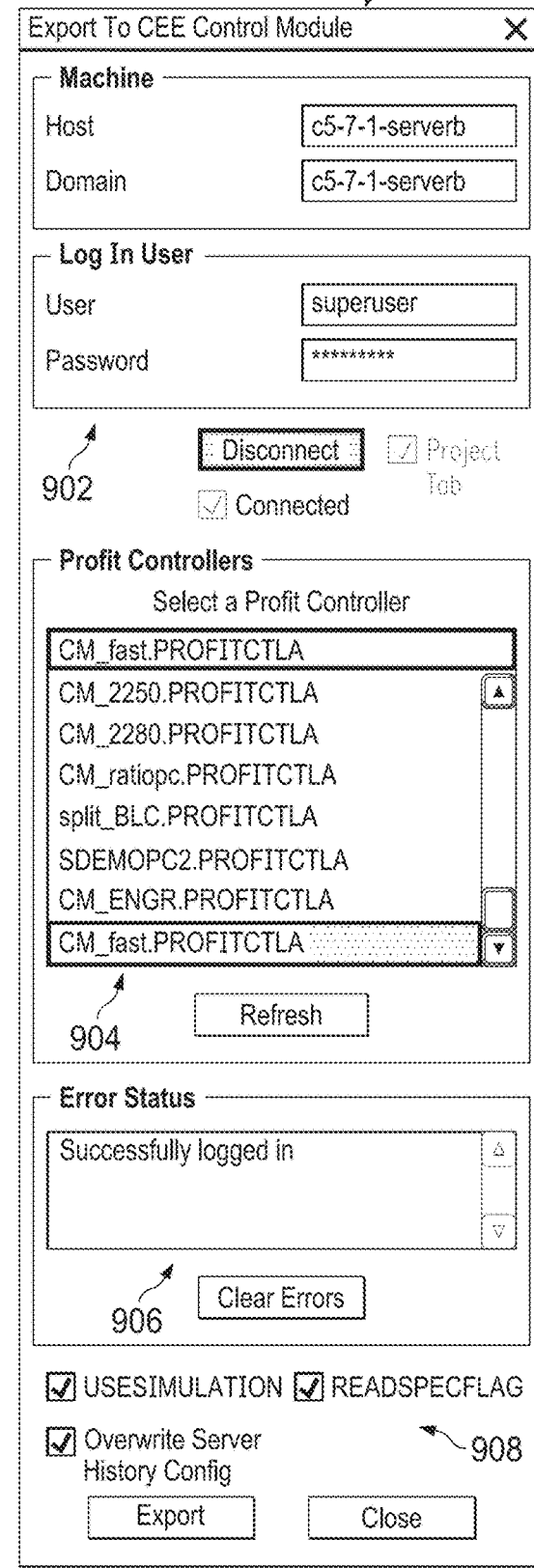

Step 5: Once the files are built, the user is given the option of exporting the files to a specified control module. An example of this is shown in FIG. 8, where the task pane 604 has been updated to include an "Export to CEE Control Module" button. The user can click this button to open an associated dialog box 900, an example of which is shown in FIG. 9. In the dialog box 900, the user can enter an EXPERION PKS (EPKS) server node name (such as a full host name) and domain, a user name, and a password and click a "Connect" button using controls 902. (Note that the "Connect" button has been replaced with a "Disconnect" button in FIG. 9 since a connection has already been formed). PSES finds and lists available PROFIT controller types of control modules in a list 904, and the user can select the control module created in Step 1 from the list 904. A connection status 906 shows whether a valid connection has been created with the selected control module.

Various flags in the form of checkboxes 908 are available for selection by the user. The user can check a USESIMULATION checkbox to set a simulation flag in the selected control module to TRUE. The user can also check a READSPECFLAG checkbox to set a READSPECFLAG flag in the selected control module to TRUE. When the READSPECFLAG flag is TRUE, upon the simulated control module's activation, the controller's initial settings and tunings can be read (such as from an xs file) and used by the controller. After the file is read once, the control module can set this flag to FALSE. An "Overwrite Server History Config" checkbox could be checked by default. When this is checked, PSES can generate a history tag list that is useful for PROFIT controller application trending purposes and push it to the control module's server history configuration.

If it is not checked, PSES can generate the list and save the list (such as to a text file) but not push it to the control module. The file name and location can be displayed in the PSES message tab. Not checking this checkbox could be useful, for example, if the user has made modifications to the control module's server history configuration and wants to preserve the changes.

Before clicking the "Export" button in FIG. 9 to push information to the control module, the user can close open instances of the selected control module in CONTROL BUILDER to prevent locking of the control module and allow PSES to push information to the control module. The user can then click on the "Export" button, and PSES can push a model, controller settings, tunings, and other information to the selected control module and set the USESIMULATION and READSPECFLAG flags for the control module. When the USESIMULATION flag is TRUE, the control module may not require a CEE PROFIT controller license to load and run. Also, there may be no need for CVs, MVs, and DVs to have any process connections to regulated control function block points. Regulated control logic can be skipped at runtime, and PSES can instead create and host a process simulator URT platform and communicate with the PROFIT controller control module through OPC to fetch MV and DV values from the control module and to provide CV values back to the control module.

Step 6: After the information is pushed to the control module, the user goes back to CONTROL BUILDER and assigns the control module to a target runtime environment (such as URT, ACE, or C300). The choice here can match the target runtime environment selected in Step 3. The user can then open the control module and assign a parent asset to the control module. An example of this is shown in FIG. 10, where a graphical user interface 1000 allows the user to (among other things) assign the parent asset. The control module can then be loaded and activated.

Figure 11:
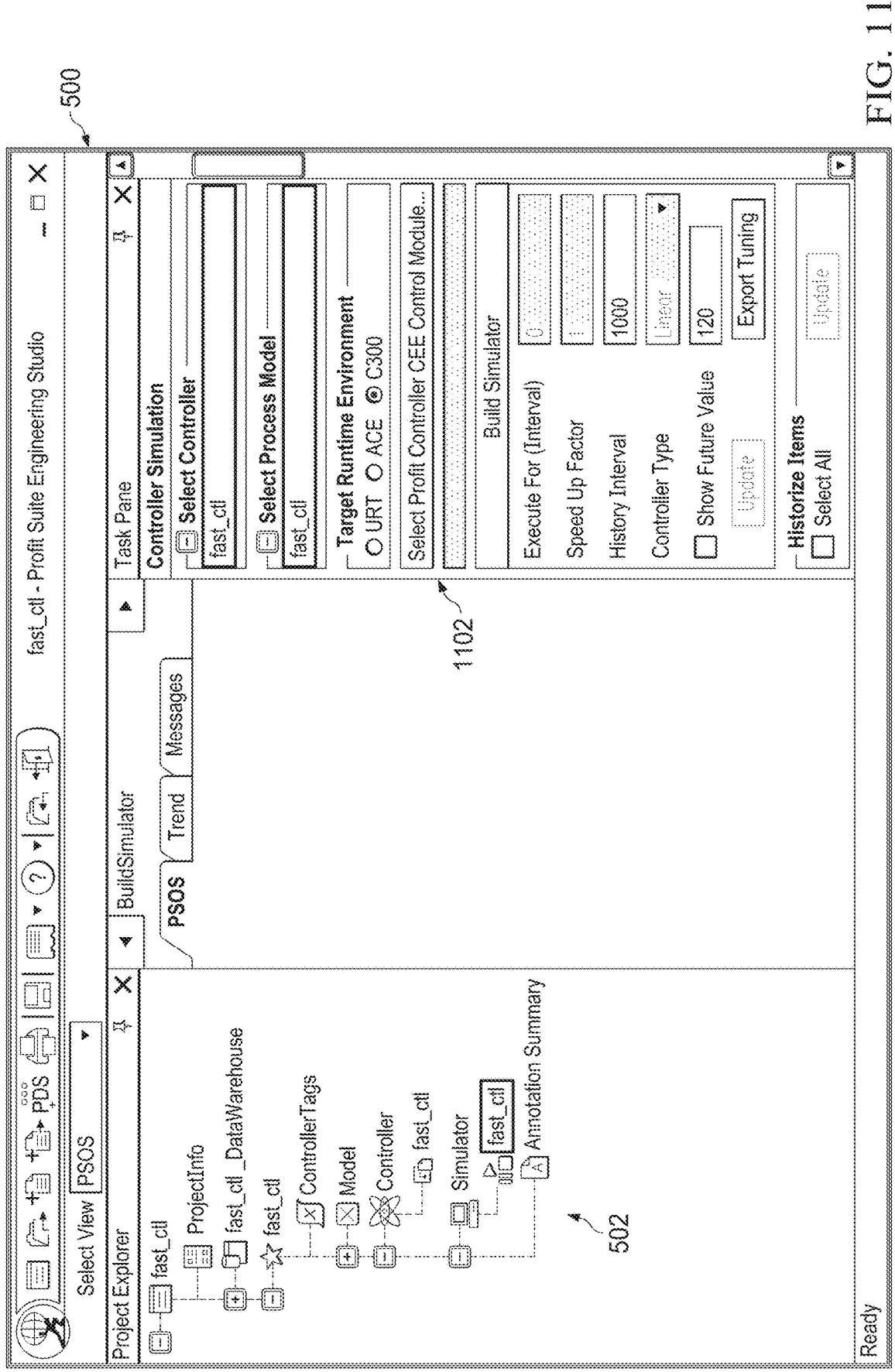
Figure 12:
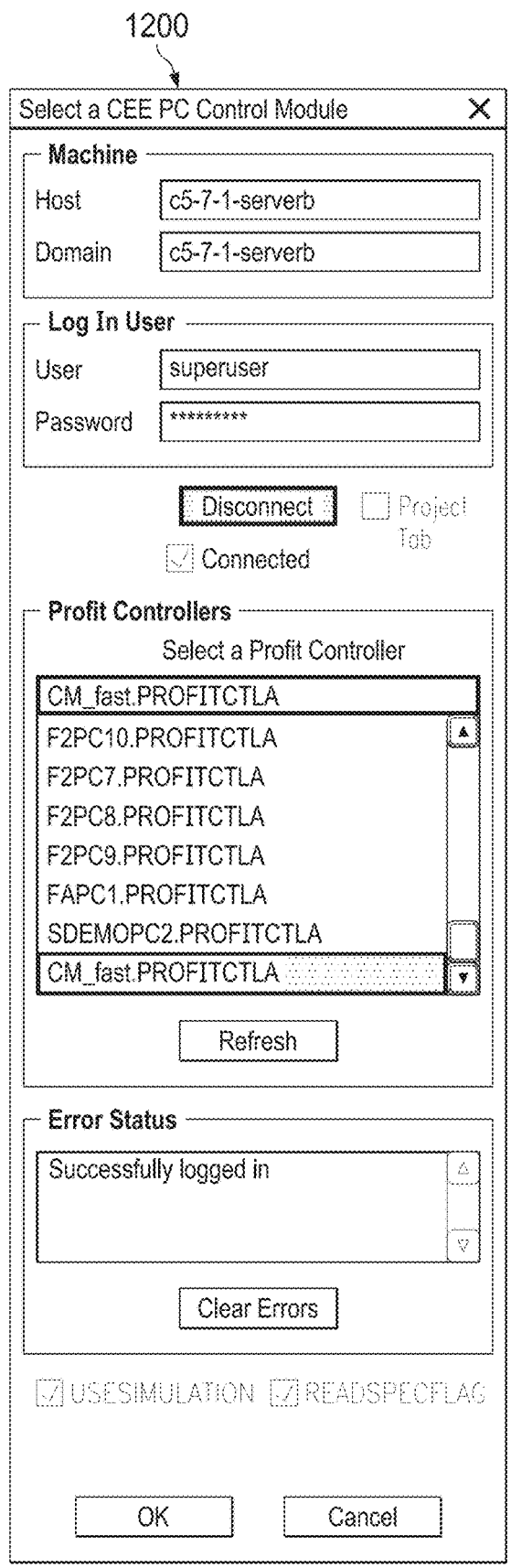
Figure 13:
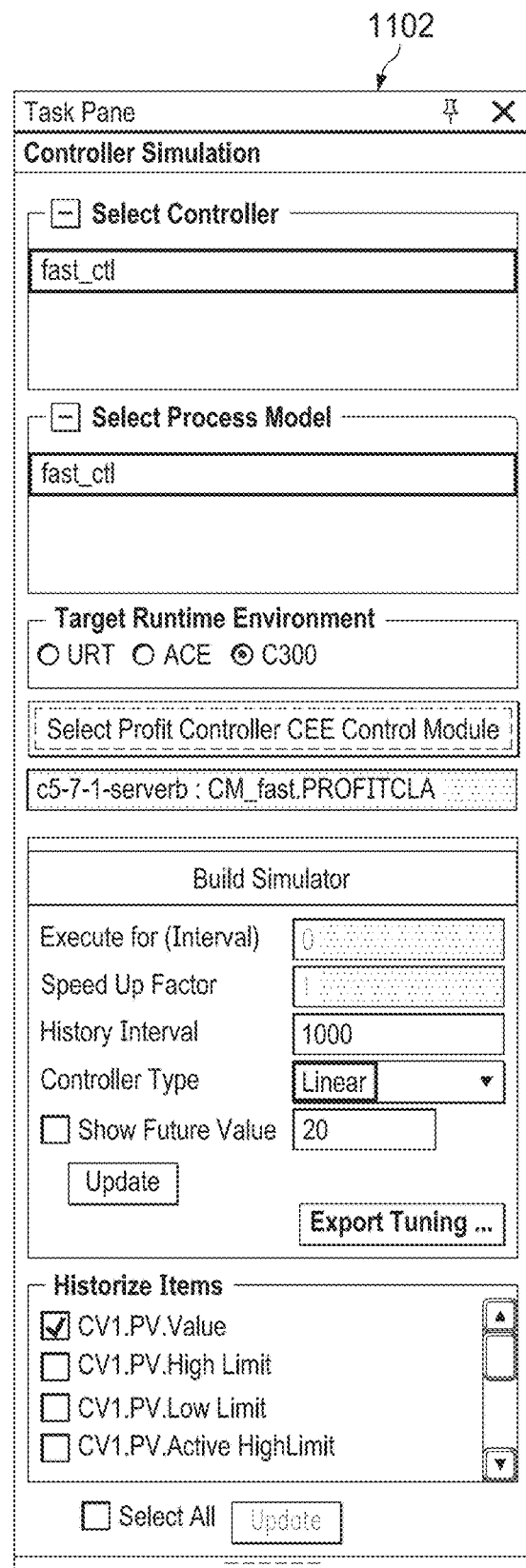

Step 7: The user goes back to PSES and creates a new simulator node. An example of this is shown in FIG. 11, where the user has created a new simulator node under the "simulator" option in the tree 502 of the graphical user interface 500. The user can select the new simulator node, such as by double clicking it. This causes the graphical user interface 500 to present the user with a task pane 1102. The user can click the "Select Profit Controller CEE Control Module" button in the task pane 1102 to open a dialog box 1200, an example of which is shown in FIG. 12. The dialog box 1200 can auto-populate much of the same information that was provided in the dialog box 900, and the USESIMULATION and READSPECFLAG checkboxes can be greyed out so that they cannot be changed. After verifying that the information is still correct, the user can click on the "Connect" button (which again has already been replaced with a "Disconnect" button here), and the user can select the control module that was created in the previous steps and click the "OK" button. After the control module is selected, the server host name and the control module name can be listed in the task pane 1102 and remembered in the project as shown in FIG. 13. If the project is saved and opened in PSES later to run the simulation again, the user may not have to reselect the control module.

Note that Steps 1 to 7 may only be needed if the user is creating a new simulation from scratch for the first time. Once the simulation has been created, the user can open an existing PSES project, select the simulation node, and go straight to Step 8 to build and start a simulation.

Step 8: The user can click on the "Build Simulator" button in the task pane 1102 to open a dialog box 1400, an example of which is shown in FIG. 14. The dialog box 1400 allows the user to select or enter bias values for a current simulation run. In FIG. 14, the dialog box 1400 has three options that the user can select to control how the bias values are provided. One (possibly the default) option can be "Use Current Values," which uses current values in the control module. With this option, the user continues from prior values from a previous simulation run or default values in the control module if this is the first simulation run. The "Read BIAS from xs" option can cause PSES to send starting bias values to the control module based on values from an xs file, which may be useful if the user wants to restart the simulation from the xs file again. The "User Entered BIAS" option causes PSES to send user-entered bias values to the control module, and the user can enter these values in a data grid below the three options.

The data grid shows the bias values from the xs file or current values in the selected controller's control module and allows the user to enter bias values. The "Var" column lists the variable type, index, and name. The "BIAS in xs" column lists the bias values from the xs file and may be read-only. The "Current" column lists the values currently in the control module and may be read-only. The "User Enter" column is an editable column to allow the user to enter new bias values, and this column could be pre-filled with values from the current control module. Buttons at the bottom of the dialog box 1400 allow the user to copy xs values to the user-entered column, copy current values to the user-enterer column, or clear all user-entered values to be zero. After specifying the bias values, the user clicks the "OK" button, the dialog box 1400 is closed, and PSES starts to create the simulator and start the simulation from the starting values specified in the dialog box 1400.

Step 9: PSES creates and starts a process simulator URT platform and establishes OPC connections between the process simulator URT platform and the control module. When done, the "message" tab of the graphical user interface 500 can show a message that the simulator has been built successfully. At this point, the user is ready to operate the controller using PSOS and to view real-time trends in PSES. Changes to the simulated control module are online and can be viewed in CONTROL BUILDER, such as under a "monitoring" view. A process ID (PID) of the URT platform could be logged in the PSES log file that is located in the URT log folder. The URT log file can be named PSES*.log, where * is the PID of the current PSES instance. The log file can be used for debugging purposes or for other functions.

Step 10: Ensure that the simulated PROFIT controller control module is active.

Figure 15:
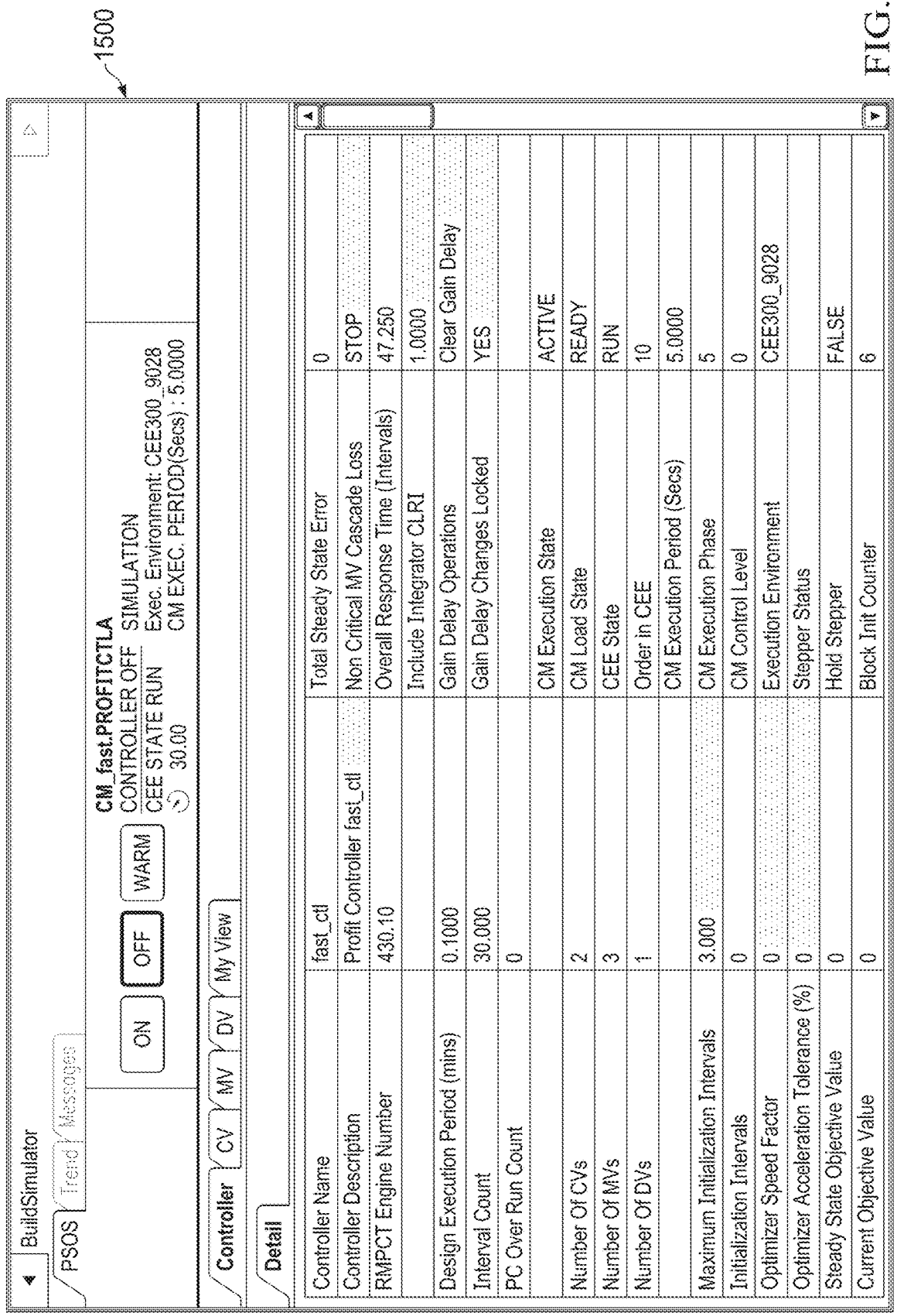
Figure 16:
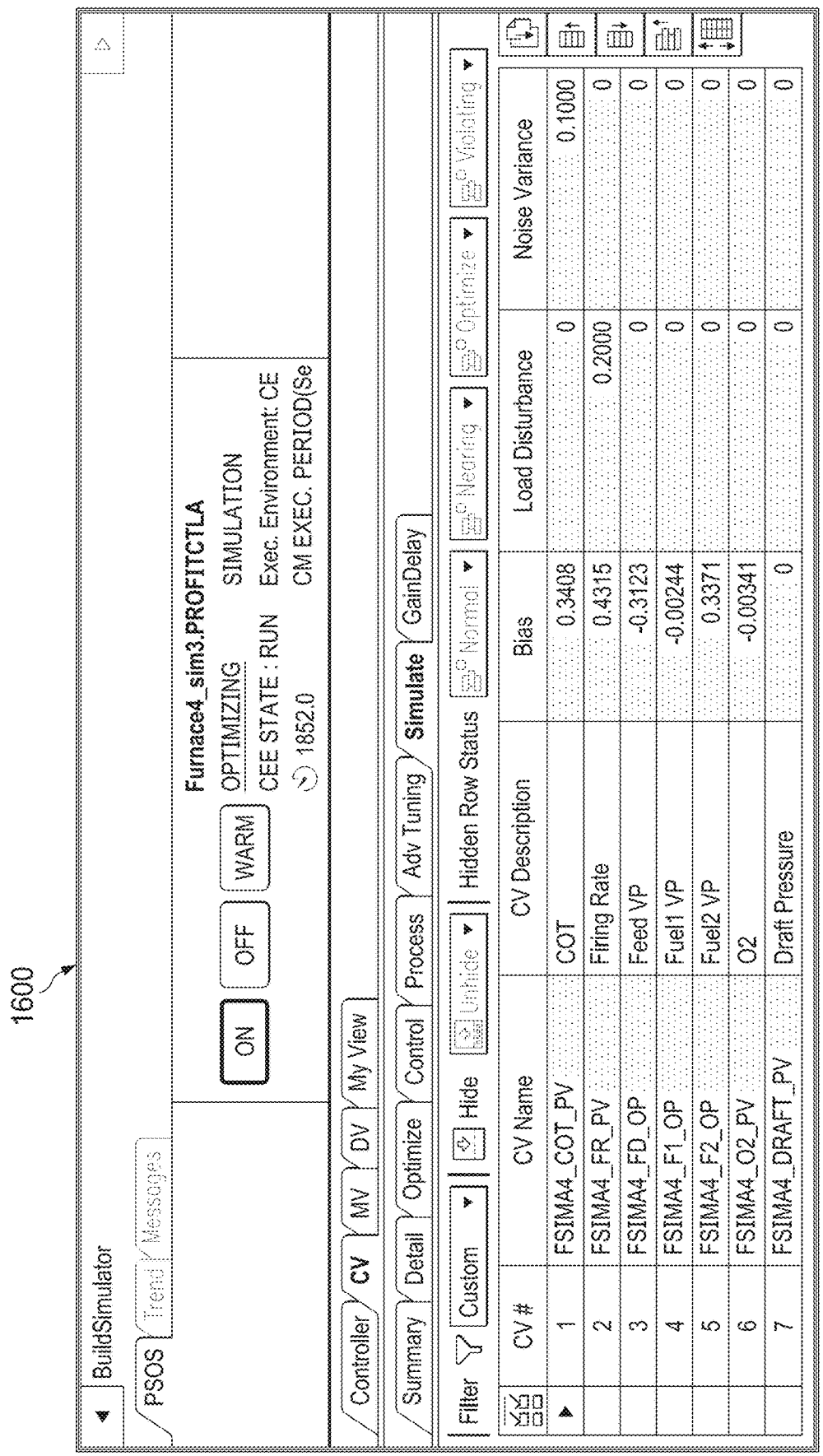
Figure 18:
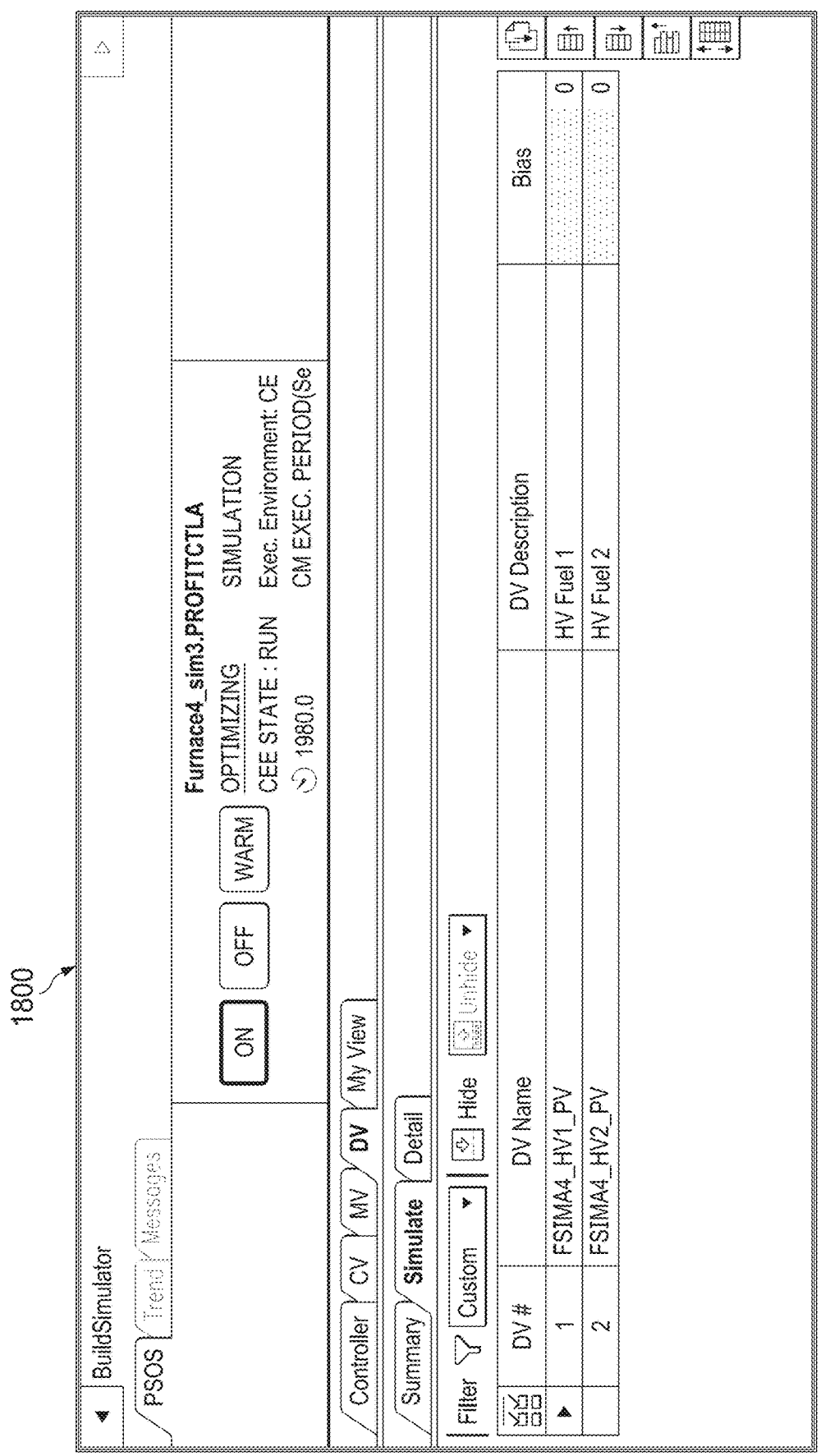

Step 11: From PSES, the user can switch to a PSOS tab to view a graphical user interface 1500, an example of which is shown in FIG. 15. The graphical user interface 1500 shows the controller in a PSES-hosted PSOS, which can look and behave the same as a normal station-hosted PSOS. The user can perform various actions, such as changing limits or tuning parameters, activating or inactivating the controller, and turning the controller mode to ON/WARM/OFF. In addition, there are tabs for CVs, MVs, and DVs, which can be selected to view various information about the process variables. Among other things, the user can select a "simulate" tab for each of the CVs, MVs, and DVs to view graphical user interfaces 1600, 1700, and 1800 as shown in FIGS. 16 through 18. These graphical user interfaces 1600, 1700, and 1800 allow the user to add noise and unmeasured disturbances to the CVs, MVs, and DVs during simulations that involve those process variables.

Figure 19:
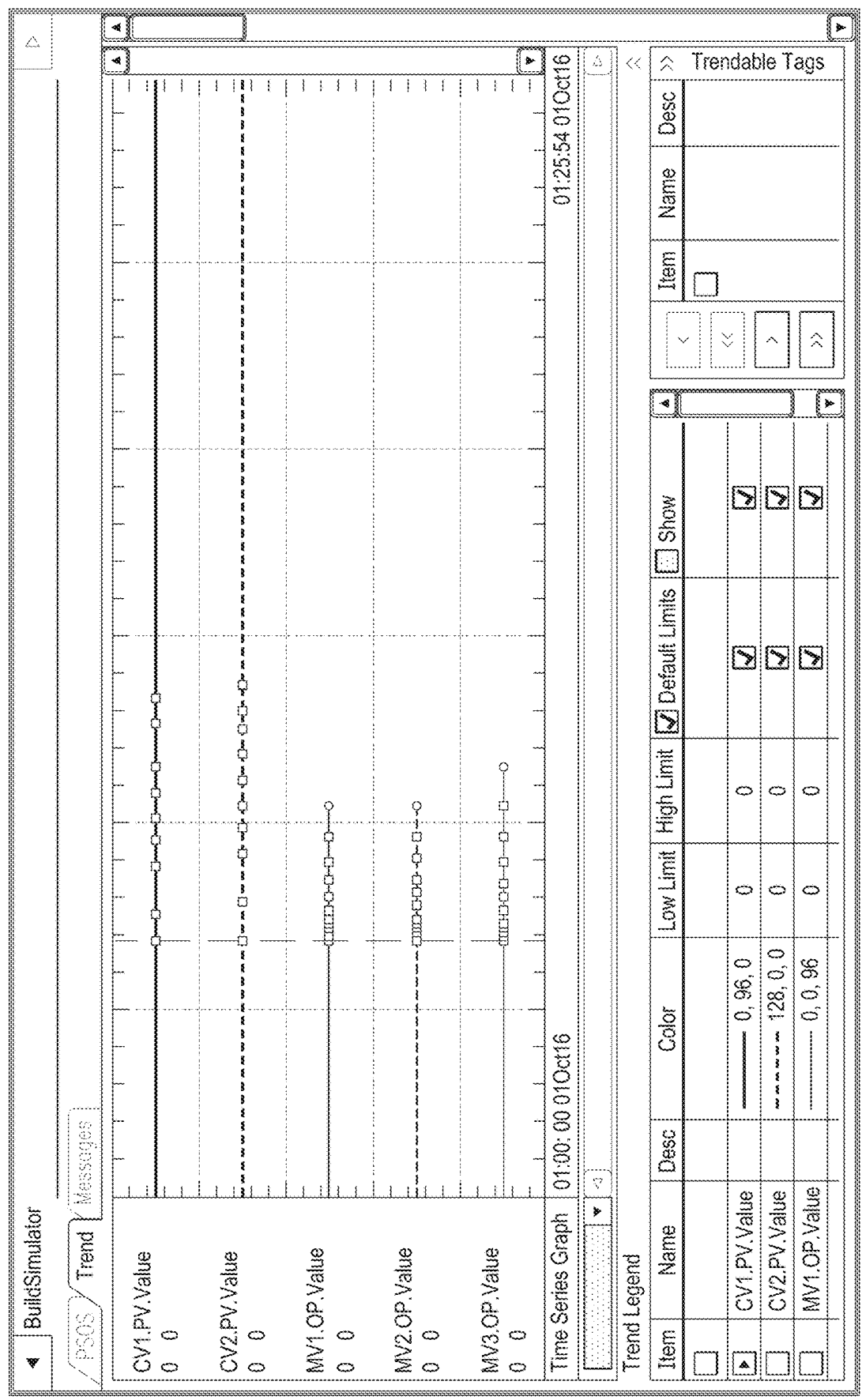

Step 12: The user can switch to the "trend" tab of the graphical user interface 500. By default, the trend tab may show real-time values of CVs, MVs, and DV but not future predicted values. The user can select a "Show Future Values" option, enter a maximum number of future values to show, and click "Update" in the task pane 1102. The future predicted values can be shown in the trend. An example of a trend diagram 1900 is shown in FIG. 19. By default, the trend could only show read values and not high or low limits or other related values. The user could select other data items (such as high/low limits) to be shown in a "Historize Items" list and click an "Update" button to view that data in the task pane 1102.

Step 13: To restart a simulation, the user can turn off and deactivate the controller in the embedded PSOS. The user can click the "Build Simulator" button in the task pane 1102, and the user can specify one or more new sets of starting values. Steps 8 through 12 can then be repeated using the new sets of starting values.

Step 14: There may be no capability to pause, slow down, or speed up a simulation, and the simulation could continuously run at a constant execution interval (although this need not be the case). To stop the simulation, the user turns off and inactivates the controller in the embedded PSOS tab, and the PSES project can be saved and closed. If the user wants to leave the PSES project open but wants to stop the simulation, the user can delete the simulator node in the tree 502. After the PSES project is closed or the simulator node is deleted, the process simulator URT platform can be stopped, and the embedded PSOS can be closed.

In order to simulate DV value changes, the "Simulate" tab can be selected as shown in FIG. 18 in the embedded PSOS in PSES. If the user clicks on the bias field for a DV, a pop-up dialog box can allow the user to enter the desired new bias value for the selected DV, and the user can select an "OK" button in the pop-up dialog box. This sets a new bias value for the selected DV. In the trend window of FIG. 19, the DV read value may not show any change, but CV values would be affected by the bias based on the appropriate models.

In order to simulate CV noise and disturbances, the "Simulate" tab can be selected as shown in FIG. 16 in the embedded PSOS in PSES. If the user clicks on the "noise variance" field or the "load disturbance" field, a pop-up dialog box can allow the user to enter the desired value for the selected CV, and the user can select an "OK" button in the pop-up dialog box. This sets a noise variance or load disturbance value for the selected CV. In the trend window, the effect of the changes on the CV read value would be shown.

Although FIGS. 4 through 19 illustrate examples of graphical user interfaces used to support process simulations for embedded multivariable predictive controllers in industrial process control and automation, various changes may be made to FIGS. 4 through 19. For example, the contents and layouts of the graphical user interfaces are for illustration only. Also, while various input and output mechanisms are shown in these figures (such as text boxes, tables, checkboxes, and drop-down menus), other mechanisms can be used for input or output of data.

FIGS. 20 through 24 illustrate example graphical user interfaces used to interact with embedded multivariable predictive controllers in industrial process control and automation systems according to this disclosure. If a user has made tuning changes during simulation and wants to apply the tunings to a PROFIT controller control module, the user can use an export function. This is how simulation PROFIT controller values are populated to a separate on-process PROFIT controller control module that is used to control an actual industrial process.

Figure 20:
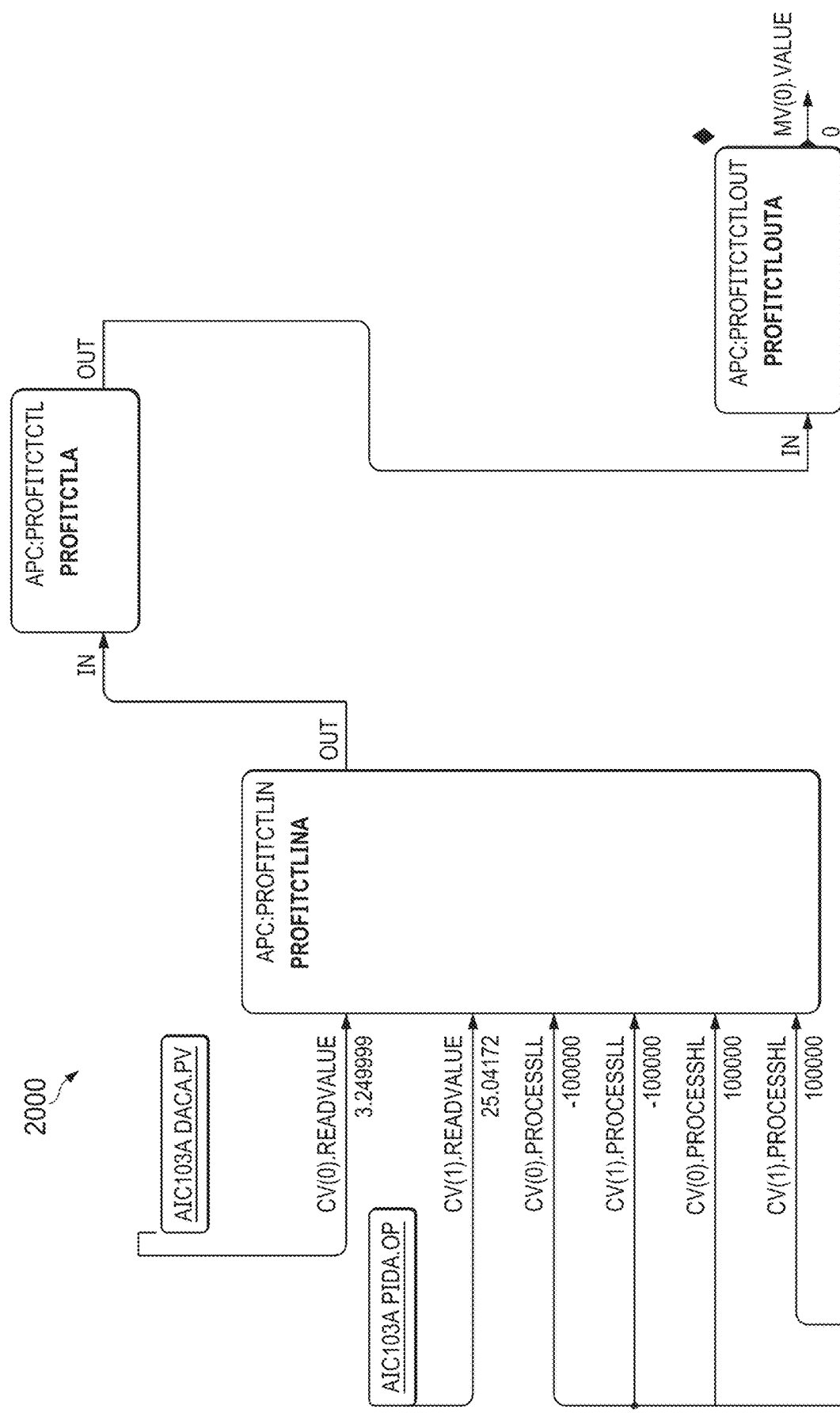
FIGS. 20 through 24 illustrate example graphical user interfaces used to interact with embedded multivariable predictive controllers in industrial process control and automation systems according to this disclosure.
Figure 21:
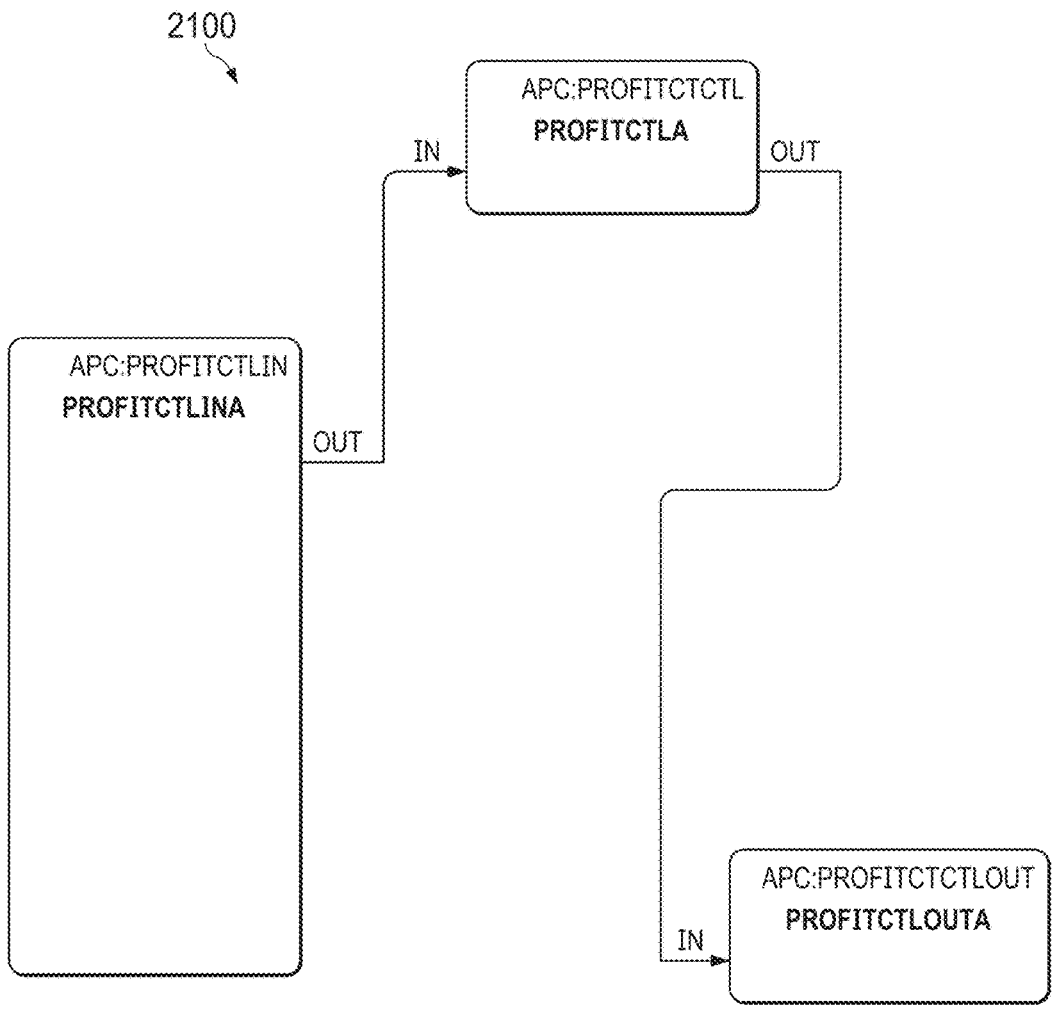
Figure 22:
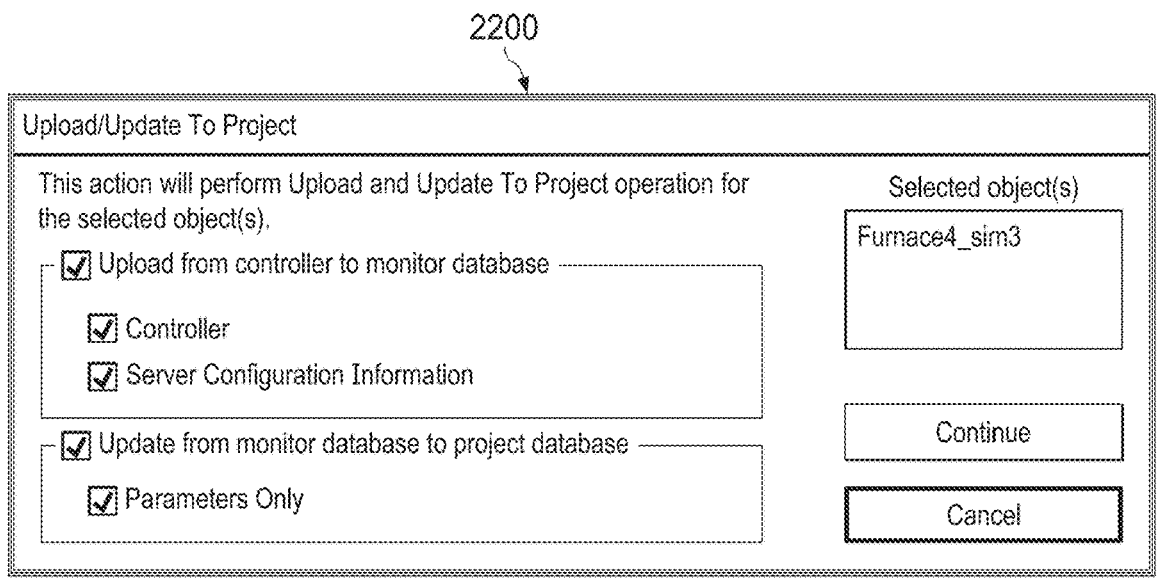
Figure 23:
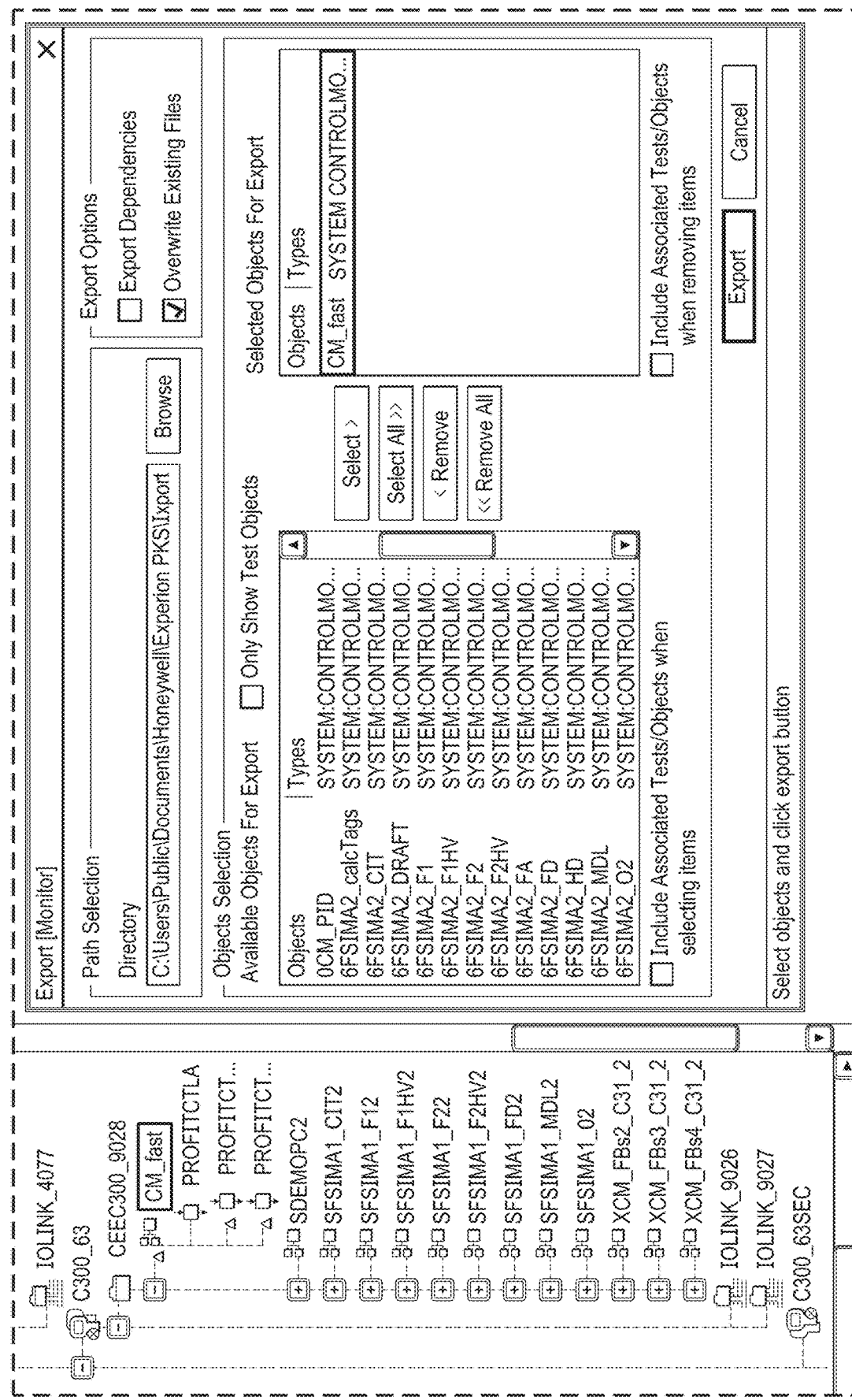

In CONTROL BUILDER, the user can create a separate control module with the three PROFIT controller blocks (ProfitCtlIn, ProfitCtl, and ProfitCtlOut), or the user can copy the simulation PROFIT controller control module. The user can configure the copy as the on-process PROFIT controller (with an appropriate name), which can have connections to regulatory control modules that are the CVs, MVs, and DVs for the on-process PROFIT controller. An example of this is shown in FIGS. 20 and 21, where a diagram 2000 represents an example on-process PROFIT controller control module and a diagram 2100 represents an example simulation PROFIT controller control module. In CONTROL BUILDER, the user can then invoke an "update to project" operation in order to view a graphical user interface 2200, an example of which is shown in FIG. 22. This allows the user to upload the current values from the simulation control module to its corresponding control module's project database. After that, in CONTROL BUILDER, the user can use a graphical user interface 2300, an example of which is shown in FIG. 23, to select which parameters to export. The user can click on the "Export" button to initiate an export operation and export the control module project side database to a *.cnf.xml file. This file includes the simulation PROFIT controller parameters' values.

Figure 24:
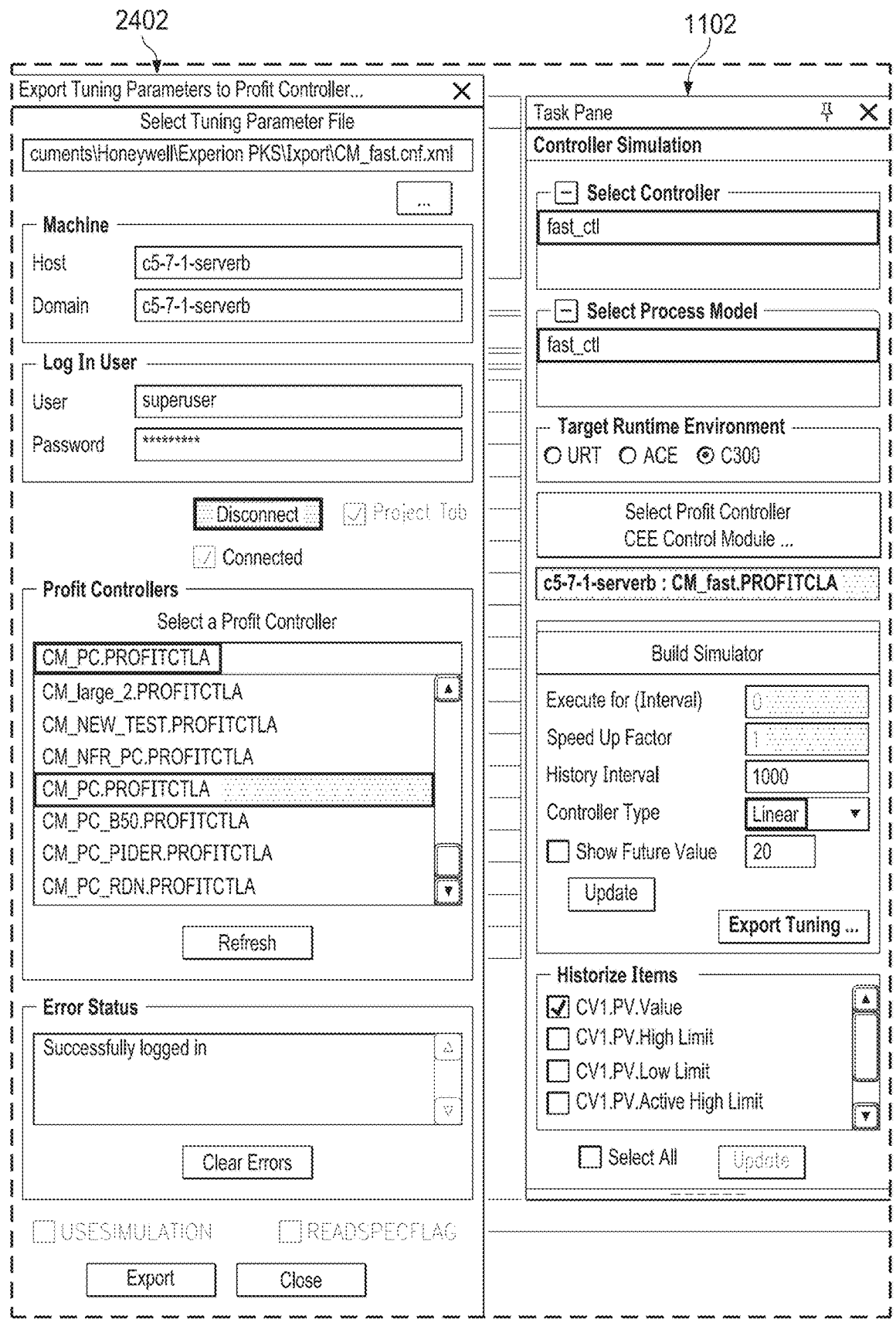

In PSES, the user can click on the "Export Tuning . . . " button in the task pane 1102 to open a dialog box 2402, an example of which is shown in FIG. 24. In the dialog box 2402, the user can browse to and select the *.cnf.xml file for the simulation PROFIT controller control module that has been saved in the previous step to be used as the tuning parameter file. The user can enter the correct host, domain, user, and password information to connect to the correct EPKS server, where the target on-process PROFIT controller control module is located. The user can select the target control module from the drop-down list and click "Export". PSES can extract a predefined subset of the tuning parameters from the *.cnf.xml file for the simulation control module and push them to the selected target control module's project database. At this point, the project side of the on-process control module's parameters has been updated with the simulation control module's parameters.

If the user would like to make a snapshot of an on-process PROFIT controller control module for use by a simulation PROFIT controller control module (such as for off-process evaluation of control/optimization strategy changes or troubleshooting), this can be performed as follows. In CONTROL BUILDER, the user can invoke the "Update to Project" operation to upload current on-process values from the on-process control module to its corresponding control module's project database. Then, in CONTROL BUILDER, the user can initiate an export operation to export the control module project side database to a *.cnf.xml file. This file includes the on-process PROFIT controller parameters' values.

In PSES, the user can click on the "Export Tuning . . . " button to open the dialog box 2402. In the dialog box 2402, the user can browse to and select the *.cnf.xml file for the on-process control module that has been saved in the previous step to be used as the tuning parameter file. The user can enter the correct host, domain, user, and password information to connect to the correct EPKS server, where the target simulation PROFIT controller control module is located. The user can select the target simulation control module from the drop down list and click "Export". PSES can extract a predefined subset of the tuning parameters from the *.cnf.xml file for the on-process control module and push them to the selected target simulation control module's project database. At this point, the project side of the simulation control module's parameters have been updated with the on-process control module's parameters.

Note that it is also possible to simply export a list of parameters, such as in a specified file type. The selection of tuning parameters included in the export can be determined by a PSES configuration file. There could be a default list of parameters defined in the configuration file, and the user can edit this file before opening PSES if the user needs to add or remove any parameters.

Note that it is further possible to run multiple simulations at the same time. On the EPKS side, a simulated control module may not need a license to run, but the total number of simulated control modules may be limited by the CEE memory limitation and available phases. PSES ordinarily runs on console or station nodes, so the user can run as many PSES instances as the user wants, and each PSES instance could host one simulation. The total number of PSES instances may be limited by the available WINDOWS or other operating system resources on the node. There may be no fixed limit in terms of how many simulations can run simultaneously.

Although FIGS. 20 through 24 illustrate examples of graphical user interfaces used to interact with embedded multivariable predictive controllers in industrial process control and automation systems, various changes may be made to FIGS. 20 through 24. For example, the contents and layouts of the graphical user interfaces are for illustration only. Also, while various input and output mechanisms are shown in these figures (such as text boxes, tables, checkboxes, and drop-down menus), other mechanisms can be used for input or output of data.

It should be noted that FIGS. 4 through 24 illustrate how PSES and PSOS could be used to perform process simulations for embedded multivariable predictive controllers. Other approaches could be used that do not depend on PSES and PSOS, and the graphical user interfaces and sequences of operations can vary depending on the implementation.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U. S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   controlling an industrial process using a multivariable predictive controller, the multivariable predictive controller executed on an embedded platform and storing one or more process variable values that are used in controlling the industrial process;
   setting a flag to disconnect the multivariable predictive controller from controlling the industrial process and operationally connecting the multivariable predictive controller to a simulator;
   retrieving one or more of the process variable values from the multivariable predictive controller;
   simulating how the multivariable predictive controller would attempt to control the industrial process based on the one or more retrieved process variable values using the simulator;
   transmitting simulated process variable values to the multivariable predictive controller;
   identifying one or more settings for the multivariable predictive controller during the simulation;
   updating the multivariable predictive controller with the one or more settings; and
   re-setting the flag to re-connect the multivariable predictive controller to control the industrial control process and operationally disconnect the multivariable predictive controller from the simulator.

2. The method of claim 1, wherein:
   simulating how the multivariable predictive controller would attempt to control the industrial process occurs during a first mode of operation of the multivariable predictive controller; and
   the multivariable predictive controller is configured to control the industrial process in a second mode of operation, wherein setting the flag controls a current mode of operation of the multivariable predictive controller.

3. The method of claim 1, further comprising:
   calculating at least one run-time memory requirement of the multivariable predictive controller.

4. The method of claim 3, further comprising:
   presenting a user with one or more recommendations for altering the at least one run-time memory requirement of the multivariable predictive controller.

5. The method of claim 1, wherein:
   simulating how the multivariable predictive controller would attempt to control the industrial process comprises using an offline simulator; and
   the method further comprises connecting the offline simulator to control the industrial process.

6. The method of claim 5, wherein:
   the multivariable predictive controller is associated with multiple process variables; and
   each process variable has an associated parameter that the offline simulator is able to read from or write to in order to interact with the multivariable predictive controller.

7. The method of claim 1, further comprising:
   performing open-loop or closed-loop model identification of the multivariable predictive controller.

8. An apparatus comprising:
   at least one processor configured to:
   control an industrial process using a multivariable predictive controller, the multivariable predictive controller executed on an embedded platform and storing one or more process variable values that are used in controlling the industrial process;
   set a flag to disconnect the multivariable predictive controller from an industrial process and connect; the multivariable predictive controller to a simulator;
   retrieve one or more of the process variable values from the multivariable predictive controller;
   simulate how the multivariable predictive controller would attempt to control the industrial process based on the retrieved process variable values using the simulator;
   transmit simulated process variable values to the multivariable predictive controller;
   identify one or more settings for the multivariable predictive controller during the simulation;
   update the multivariable predictive controller with the one or more settings; and
   reset the flag to reconnect the multivariable predictive controller to the industrial process and cause the multivariable predictive controller to control the industrial process.

9. The apparatus of claim 8, wherein the at least one processor is configured to simulate how the multivariable predictive controller would attempt to control the industrial process during a first mode of operation of the multivariable predictive controller, the multivariable predictive controller is configured to control the industrial process in a second mode of operation.

10. The apparatus of claim 9, wherein the flag controls a current mode of operation of the multivariable predictive controller.

11. The apparatus of claim 8, wherein the at least one processor is further configured to at least one of:
calculate at least one run-time memory requirement of the multivariable predictive controller; and
present a user with one or more recommendations for altering the at least one run-time memory requirement of the multivariable predictive controller.

12. The apparatus of claim 8, wherein the at least one processor is further configured to:
identify one or more settings for the multivariable predictive controller during the simulation; and
update the multivariable predictive controller with the one or more settings.

13. The apparatus of claim 8, wherein:
the at least one processor is configured to simulate how the multivariable predictive controller would attempt to control the industrial process by executing an offline simulator; and
the at least one processor is further configured to use the offline simulator to control the industrial process.

14. The apparatus of claim 13, wherein:
the multivariable predictive controller is associated with multiple process variables; and
each process variable has an associated parameter that the offline simulator is able to read from or write to in order to interact with the multivariable predictive controller.

15. A non-transitory computer readable medium containing instructions that when executed cause at least one processing device to:
control an industrial process using a multivariable predictive controller, the multivariable predictive controller executed on an embedded platform and storing one or more process variable values that are used in controlling the industrial process;
set a flag to disconnect the multivariable predictive controller from the industrial process and connect the multivariable predictive controller to a simulator;
retrieve one or more of the process variable values from a the multivariable predictive controller;
simulate how the multivariable predictive controller would attempt to control the industrial process based on the one or more retrieved process variable values using the simulator;
transmit simulated process variable values to the multivariable predictive controller;
identify one or more settings for the multivariable predictive controller during the simulation;
update the multivariable predictive controller with the one or more settings; and
reset the flag to reconnect the multivariable predictive controller to the industrial process and cause the multivariable predictive controller to control the industrial process.

16. The non-transitory computer readable medium of claim 15, wherein:
the simulation of how the multivariable predictive controller would attempt to control the industrial process occurs during a first mode of operation of the multivariable predictive controller; and
the multivariable predictive controller is configured to control the industrial process in a second mode of operation.

17. The non-transitory computer readable medium of claim 16,
wherein the flag controls a current mode of operation of the multivariable predictive controller.

18. The non-transitory computer readable medium of claim 15, further containing instructions that when executed cause the at least one processing device to at least one of:
calculate at least one run-time memory requirement of the multivariable predictive controller; and
present a user with one or more recommendations for altering the at least one run-time memory requirement of the multivariable predictive controller.

* * * * *